(12) United States Patent
Shrivastava et al.

(10) Patent No.: US 10,387,221 B2
(45) Date of Patent: Aug. 20, 2019

(54) MULTIPLE INTERACTING SYSTEMS AT A SITE

(71) Applicant: View, Inc., Milpitas, CA (US)

(72) Inventors: Dhairya Shrivastava, Los Altos, CA (US); Stephen Clark Brown, San Mateo, CA (US); Ronald F. Cadet, Redwood City, CA (US)

(73) Assignee: View, Inc., Milpitas, CA (US)

( * ) Notice: Subject to any disclaimer, the term of this patent is extended or adjusted under 35 U.S.C. 154(b) by 0 days.

(21) Appl. No.: 15/910,936

(22) Filed: Mar. 2, 2018

(65) Prior Publication Data

US 2018/0189117 A1 Jul. 5, 2018

Related U.S. Application Data

(63) Continuation of application No. 15/534,175, filed as application No. PCT/US2015/064555 on Dec. 8, 2015.
(Continued)

(51) Int. Cl.
*G06F 3/00* (2006.01)
*G06F 9/44* (2018.01)
(Continued)

(52) U.S. Cl.
CPC ............ *G06F 9/54* (2013.01); *E06B 9/24* (2013.01); *G02F 1/163* (2013.01); *G05B 15/02* (2013.01);
(Continued)

(58) Field of Classification Search
CPC .................................................. G06F 9/54
(Continued)

(56) References Cited

U.S. PATENT DOCUMENTS

| 4,129,861 | A | 12/1978 | Giglia |
| 5,384,653 | A | 1/1995 | Benson et al. |

(Continued)

FOREIGN PATENT DOCUMENTS

| DE | 2933371 A1 | 3/1981 |
| EP | 2357544 | 8/2011 |

(Continued)

OTHER PUBLICATIONS

U.S. Final Office Action dated Jan. 27, 2014 in U.S. Appl. No. 13/479,137.
(Continued)

*Primary Examiner* — Timothy A Mudrick
(74) *Attorney, Agent, or Firm* — Weaver Austin Villeneuve & Sampson LLP; Brian D. Griedel

(57) ABSTRACT

Disclosed are platforms for communicating among one or more otherwise independent systems involved in controlling functions of buildings or other sites having switchable optical devices deployed therein. Such independent systems include a window control system and one or more other independent systems such as systems that control residential home products (e.g., thermostats, smoke alarms, etc.), HVAC systems, security systems, lighting control systems, and the like. Together the systems control and/or monitor multiple features and/or products, including switchable windows and other infrastructure of a site, which may be a commercial, residential, or public site.

18 Claims, 10 Drawing Sheets

Related U.S. Application Data

(60) Provisional application No. 62/088,943, filed on Dec. 8, 2014.

(51) Int. Cl.

| | | |
|---|---|---|
| *G06F 9/46* | (2006.01) | |
| *G06F 13/00* | (2006.01) | |
| *G06F 9/54* | (2006.01) | |
| *G05B 15/02* | (2006.01) | |
| *E06B 9/24* | (2006.01) | |
| *G02F 1/163* | (2006.01) | |
| *G06Q 50/10* | (2012.01) | |
| *G06F 17/00* | (2019.01) | |

(52) U.S. Cl.
CPC ...... *G06Q 50/10* (2013.01); *E06B 2009/2464* (2013.01); *G05B 2219/2614* (2013.01); *G05B 2219/2628* (2013.01); *G05B 2219/2642* (2013.01); *G06F 17/00* (2013.01)

(58) Field of Classification Search
USPC ........................................................ 719/318
See application file for complete search history.

(56) References Cited

U.S. PATENT DOCUMENTS

| | | |
|---|---|---|
| 5,416,617 A | 5/1995 | Loiseaux et al. |
| 5,579,149 A | 11/1996 | Moret et al. |
| 5,705,983 A | 1/1998 | Tweadey, II et al. |
| 6,039,390 A | 3/2000 | Agrawal et al. |
| 6,055,089 A | 4/2000 | Schulz et al. |
| 6,262,831 B1 | 7/2001 | Bauer et al. |
| 6,407,847 B1 | 6/2002 | Poll et al. |
| 6,707,590 B1 | 3/2004 | Bartsch |
| 6,794,882 B2 | 9/2004 | Jessup |
| 6,829,511 B2 | 12/2004 | Bechtel et al. |
| 6,897,936 B1 | 5/2005 | Li et al. |
| 6,965,813 B2 | 11/2005 | Granqvist et al. |
| 7,133,181 B2 | 11/2006 | Greer |
| 7,684,105 B2 | 3/2010 | Lamontagne et al. |
| 7,941,245 B1 | 5/2011 | Popat |
| 8,213,074 B1 | 7/2012 | Shrivastava et al. |
| 8,219,217 B2 | 7/2012 | Bechtel et al. |
| 8,254,013 B2 | 8/2012 | Mehtani et al. |
| 8,705,162 B2 | 4/2014 | Brown et al. |
| 8,764,950 B2 | 7/2014 | Wang et al. |
| 8,843,238 B2 | 9/2014 | Wenzel et al. |
| 8,976,440 B2 | 3/2015 | Berland et al. |
| 9,081,246 B2 | 7/2015 | Rozbicki |
| 9,128,346 B2 | 9/2015 | Shrivastava et al. |
| 9,170,008 B2 | 10/2015 | Reul et al. |
| 9,300,581 B1 | 3/2016 | Hui et al. |
| 9,442,338 B2 | 9/2016 | Uhm et al. |
| 9,442,341 B2 | 9/2016 | Shrivastava et al. |
| 9,454,055 B2 | 9/2016 | Brown et al. |
| 9,470,947 B2 | 10/2016 | Nagel et al. |
| 9,677,327 B1 | 6/2017 | Nagel et al. |
| 9,690,174 B2 | 6/2017 | Wang |
| 9,709,869 B2 | 7/2017 | Baumann et al. |
| 9,740,074 B2 | 8/2017 | Agrawal et al. |
| 9,778,533 B2 | 10/2017 | Bertolini |
| 9,946,138 B2 | 4/2018 | Shrivastava et al. |
| 10,001,691 B2 | 6/2018 | Shrivastava et al. |
| 10,137,764 B2 | 11/2018 | Driscoll et al. |
| 2002/0027504 A1 | 3/2002 | Davis et al. |
| 2002/0149829 A1 | 10/2002 | Mochizuka et al. |
| 2003/0227663 A1 | 12/2003 | Agrawal et al. |
| 2004/0215520 A1 | 10/2004 | Butler et al. |
| 2005/0270620 A1 | 12/2005 | Bauer et al. |
| 2005/0270621 A1 | 12/2005 | Bauer et al. |
| 2006/0018000 A1 | 1/2006 | Greer |
| 2006/0107616 A1 | 5/2006 | Ratti et al. |
| 2006/0279527 A1 | 12/2006 | Zehner et al. |
| 2007/0053053 A1 | 3/2007 | Moskowitz |
| 2007/0285759 A1 | 12/2007 | Ash et al. |
| 2008/0043316 A2 | 2/2008 | Moskowitz |
| 2008/0211682 A1 | 9/2008 | Hyland et al. |
| 2009/0271042 A1 | 10/2009 | Voysey |
| 2009/0323160 A1 | 12/2009 | Egerton et al. |
| 2010/0039410 A1 | 2/2010 | Becker et al. |
| 2010/0188057 A1 | 7/2010 | Tarng |
| 2010/0228854 A1 | 9/2010 | Morrison et al. |
| 2010/0243427 A1 | 9/2010 | Kozlowski et al. |
| 2010/0245973 A1 | 9/2010 | Wang et al. |
| 2010/0274366 A1 | 10/2010 | Fata et al. |
| 2010/0315693 A1 | 12/2010 | Lam et al. |
| 2011/0071685 A1 | 3/2011 | Huneycutt et al. |
| 2011/0097081 A1 | 4/2011 | Gupta et al. |
| 2011/0148218 A1 | 6/2011 | Rozbicki |
| 2011/0164317 A1 | 7/2011 | Verghol et al. |
| 2011/0266137 A1 | 11/2011 | Wang et al. |
| 2011/0266138 A1 | 11/2011 | Wang et al. |
| 2011/0267674 A1 | 11/2011 | Wang et al. |
| 2011/0267675 A1 | 11/2011 | Wang et al. |
| 2012/0026573 A1 | 2/2012 | Collins et al. |
| 2012/0033287 A1 | 2/2012 | Friedman et al. |
| 2012/0062975 A1 | 3/2012 | Mehtani et al. |
| 2012/0086363 A1 | 4/2012 | Golding et al. |
| 2012/0188627 A1 | 7/2012 | Chen et al. |
| 2012/0190386 A1 | 7/2012 | Anderson |
| 2012/0194895 A1 | 8/2012 | Podbelski et al. |
| 2012/0235493 A1 | 9/2012 | Kiuchi et al. |
| 2012/0239209 A1 | 9/2012 | Brown et al. |
| 2012/0259583 A1 | 10/2012 | Noboa et al. |
| 2012/0293855 A1 | 11/2012 | Shrivastava et al. |
| 2013/0060357 A1 | 3/2013 | Li et al. |
| 2013/0085614 A1 | 4/2013 | Wenzel et al. |
| 2013/0085615 A1 | 4/2013 | Barker |
| 2013/0085616 A1 | 4/2013 | Wenzel et al. |
| 2013/0131869 A1 | 5/2013 | Majewski et al. |
| 2013/0157493 A1 | 6/2013 | Brown |
| 2013/0196600 A1 | 8/2013 | Capers et al. |
| 2013/0241299 A1 | 9/2013 | Snyker et al. |
| 2013/0271812 A1 | 10/2013 | Brown et al. |
| 2013/0271813 A1 | 10/2013 | Brown |
| 2013/0271814 A1 | 10/2013 | Brown |
| 2013/0278989 A1 | 10/2013 | Lam et al. |
| 2014/0156097 A1 | 6/2014 | Nesler et al. |
| 2014/0160550 A1 | 6/2014 | Brown et al. |
| 2014/0170863 A1 | 6/2014 | Brown |
| 2014/0236323 A1 | 8/2014 | Brown et al. |
| 2014/0303788 A1 | 10/2014 | Sanders et al. |
| 2014/0330538 A1 | 11/2014 | Conklin et al. |
| 2014/0347190 A1 | 11/2014 | Grimm |
| 2014/0349497 A1 | 11/2014 | Brown et al. |
| 2015/0023661 A1 | 1/2015 | Borkenhagen et al. |
| 2015/0116811 A1* | 4/2015 | Shrivastava ........... G08C 17/02 359/275 |
| 2015/0120297 A1 | 4/2015 | Meruva |
| 2015/0003822 A1 | 6/2015 | Fukada et al. |
| 2015/0160525 A1 | 6/2015 | Shi |
| 2015/0378230 A1 | 12/2015 | Gudmunson et al. |
| 2015/0378231 A1 | 12/2015 | Greer et al. |
| 2016/0070151 A1 | 3/2016 | Shrivastava et al. |
| 2016/0109778 A1 | 4/2016 | Shrivastava et al. |
| 2016/0154290 A1 | 6/2016 | Brown et al. |
| 2016/0202589 A1 | 7/2016 | Nagel et al. |
| 2017/0075323 A1 | 3/2017 | Shrivastava et al. |
| 2017/0097259 A1 | 4/2017 | Brown et al. |
| 2017/0139301 A1 | 5/2017 | Messere et al. |
| 2017/0197494 A1 | 7/2017 | Li |
| 2017/0200424 A1 | 7/2017 | Xu et al. |
| 2017/0212400 A1 | 7/2017 | Shrivastava et al. |
| 2017/0253801 A1 | 9/2017 | Bae et al. |
| 2017/0279930 A1 | 9/2017 | Zhang |
| 2017/0285432 A1 | 10/2017 | Shrivastava et al. |
| 2017/0285433 A1 | 10/2017 | Shrivastava et al. |
| 2017/0347129 A1 | 11/2017 | Levi et al. |
| 2017/0364395 A1 | 12/2017 | Shrivastava et al. |
| 2018/0090992 A1 | 3/2018 | Shrivastava et al. |
| 2018/0129172 A1 | 5/2018 | Shrivastava et al. |
| 2018/0144712 A1 | 5/2018 | Threlkel et al. |
| 2018/0187478 A1 | 7/2018 | Vigano et al. |

(56) References Cited

U.S. PATENT DOCUMENTS

| | | |
|---|---|---|
| 2018/0188628 A1 | 7/2018 | Brown et al. |
| 2018/0267380 A1 | 9/2018 | Shrivastava et al. |
| 2018/0284555 A1 | 10/2018 | Klawuhn et al. |

FOREIGN PATENT DOCUMENTS

| | | |
|---|---|---|
| EP | 2648086 A2 | 10/2013 |
| EP | 2764998 A1 | 8/2014 |
| EP | 3015915 A1 | 5/2016 |
| EP | 3352053 A1 | 7/2018 |
| GB | 2169426 A | 7/1986 |
| KR | 10-2012-0045915 | 5/2012 |
| KR | 10-2014-0004175 A | 1/2014 |
| KR | 10-1346862 B | 1/2014 |
| KR | 10-1799323 B1 | 11/2017 |
| RU | 104808 U1 | 5/2011 |
| TW | 200532346 A | 10/2005 |
| WO | WO89/006302 | 7/1989 |
| WO | WO2012/079159 | 6/2012 |
| WO | WO2013/177575 A1 | 11/2013 |
| WO | WO2014/082092 | 5/2014 |
| WO | WO2014/121809 | 8/2014 |
| WO | WO2014/209812 | 12/2014 |
| WO | WO2015/051262 A1 | 4/2015 |
| WO | WO2016/004109 | 1/2016 |
| WO | WO2016/085964 | 6/2016 |
| WO | WO2016/094445 | 6/2016 |
| WO | WO2016/183059 A1 | 11/2016 |
| WO | WO2017/007841 A1 | 1/2017 |
| WO | WO2017/075059 | 5/2017 |
| WO | WO2018/200702 A1 | 11/2018 |
| WO | WO2018/200740 A1 | 11/2018 |
| WO | WO2018/200752 A1 | 11/2018 |

OTHER PUBLICATIONS

U.S. Final Office Action dated Feb. 26, 2015 in U.S. Appl. No. 13/479,137.
U.S. Notice of Allowance dated May 14, 2015 in U.S. Appl. No. 13/479,137.
U.S. Notice of Allowance (supplemental) dated Jun. 12, 2015 in U.S. Appl. No. 13/479,137.
U.S. Office Action dated Sep. 23, 2013 in U.S. Appl. No. 13/479,137.
U.S. Office Action dated Jul. 3, 2014 in U.S. Appl. No. 13/479,137.
U.S. Final Office Action dated Sep. 19, 2016 in U.S. Appl. No. 14/887,178.
U.S. Final Office Action dated Mar. 17, 2017 in U.S. Appl. No. 14/887,178.
U.S. Office Action dated Mar. 25, 2016 in U.S. Appl. No. 14/887,178.
U.S. Office Action dated Oct. 23, 2017 in U.S. Appl. No. 14/887,178.
U.S. Notice of Allowance dated Mar. 9, 2018 in U.S. Appl. No. 14/887,178.
U.S. Office Action dated Jul. 24, 2018 in U.S. Appl. No. 15/978,029.
U.S. Notice of Allowance dated Dec. 13, 2018 in U.S. Appl. No. 15/978,029.
Preliminary Amendment dated Jan. 18, 2017 in U.S. Appl. No. 15/123,069.
U.S. Office Action dated Apr. 27, 2018 in U.S. Appl. No. 15/123,069.
U.S. Notice of Allowance dated Nov. 28, 2018 in U.S. Appl. No. 15/123,069.
U.S. Office Action dated Sep. 4, 2018 in U.S. Appl. No. 15/320,725.
U.S. Office Action dated Jul. 6, 2018 in U.S. Appl. No. 15/534,175.
U.S. Office Action dated Sep. 11, 2017 in U.S. Appl. No. 14/951,410.
U.S. Final Office Action dated Mar. 15, 2018 in U.S. Appl. No. 14/951,410.
U.S. Notice of Allowance dated Oct. 22, 2018 in U.S. Appl. No. 14/951,410.
International Preliminary Report on Patentability dated Jun. 8, 2017 in PCT/US2015/062480.
International Search Report and Written Opinion dated Feb. 15, 2016 in PCT/US2015/062480.
International Search Report and Written Opinion dated May 29, 2015 in Application No. PCT/US2015/019031.
International Preliminary Report on Patentability dated Sep. 15, 2016 in Application No. PCT/US2015/019031.
International Preliminary Report on Patentability dated Jan. 12, 2017 in PCT Application No. PCT/US15/38667.
International Search Report and Written Opinion dated Oct. 16, 2015 in PCT Application No. PCT/US15/38667.
International Preliminary Report on Patentability dated Jun. 22, 2017 in PCT Application No. PCT/US15/64555.
International Search Report and Written Opinion dated Oct. 16, 2015 in PCT Application No. PCT/US15/64555.
International Search Report and Written Opinion dated Nov. 16, 2018 in PCT Application No. PCT/US2018/029460.
International Search Report and Written Opinion dated Oct. 15, 2018 in PCT Application No. PCT/US2018/029406.
CN Office Action dated Aug. 28, 2018 in CN Application No. 201580070776.3.
EP Extended Search Report dated Nov. 8, 2018 in EP Application No. 15863112.7.
EP Extended Search Report dated Jun. 19, 2017 in EP Application No. 15758538.1.
EP Office Action dated Aug. 21, 2018 in EP Application No. 15758538.1.
EP Extended Search Report dated Feb. 15, 2018 in EP Application No. 15814233.1.
EP Extended Search Report dated Jun. 5, 2018 in EP Application No. 15868003.3.
RU Office Action dated Sep. 24, 2018 in RU Application No. 2016139012.
APC by Schneider Electric, Smart-UPS 120V Product Brochure, 2013, 8 pp.
National Aeronautics & Space Administration, "Cloud Remote Sensing and Modeling," (undated) [http://atmospheres.gsfc.nasa.gov/climate/index.php?section=134].
Kipp & Zonen, "Solar Radiation" (undated) [http://www.kippzonen.com/Knowledge-Center/Theoretical-info/Solar-Radiation].
Duchon, Claude E. et al., "Estimating Cloud Type from Pyranometer Observations," Journal of Applied Meteorology, vol. 38, Jan. 1999, pp. 132-141.
"SageGlass Unplugged™—wireless dynamic glass", 2014, 2 pages.
"Ossia Wireless Charging", screenshot and picture of Cota device, accessed Apr. 20, 2015, 1 page.
"SageGlass Mobile App" screenshot, accessed Aug. 28, 2015, 1 page.
"Sage Product Highlights" screenshot, accessed Aug. 28, 2015, 1 page.
"SageGlass Unplugged" screenshot, accessed Aug. 28, 2015, 1 page.
U.S. Office Action dated Feb. 7, 2019 in U.S. Appl. No. 15/623,237.
U.S. Office Action dated Feb. 7, 2019 in U.S. Appl. No. 15/691,468.
U.S. Final Office Action dated Jan. 31, 2019 in U.S. Appl. No. 15/534,175.
CN Office Action dated Feb. 2, 2019 in CN Application No. 201580015979.2; machine translation.
EP Examination Report dated Mar. 4, 2019 in EP Application No. 15814233.1.
Taiwanese Office Action dated Dec. 12, 2018 in TW Application No. 107129150.
U.S. Appl. No. 16/253,971, filed Jan. 22, 2019, Brown et al.
U.S. Appl. No. 16/254,434, filed Jan. 22, 2019, Brown et al.

\* cited by examiner

A - Direct Sunlight Penetration
B - Clear Sky Prediction
C - Real-time Irradiance accounting for obstructed and reflected

MULTIPLE INTERACTING SYSTEMS AT A SITE

PRIORITY DATA

This application is a continuation of and claims priority to U.S. patent application Ser. No. 15/534,175, titled "MULTIPLE INTERACTING SYSTEMS AT A SITE," filed on Jun. 8, 2017, which is a national phase application of PCT Patent Application No. PCT/US15/64555, titled "MULTIPLE INTERACTING SYSTEMS AT A SITE," filed on Dec. 8, 2015 which claims benefit of U.S. Provisional Patent Application No. 62/088,943, titled "MULTIPLE INTERACTING SYSTEMS AT A SITE," filed on Dec. 8, 2014, all of which are incorporated herein by reference in their entireties and for all purposes.

BACKGROUND

Electrically tintable windows such as electrochromic windows, sometimes referred to as "smart windows," have been deployed in limited installations. As such windows gain acceptance and are more widely deployed, they may require increasingly sophisticated control and monitoring systems, as there may be a various systems interacting with smart windows for the benefit of buildings and associated infrastructure. Improved techniques for managing interacting building systems are necessary.

SUMMARY

Certain aspects of the disclosure pertain to a plurality of interacting systems including a window control system and at least one other system which may be a lighting system, an HVAC systems, a security system, and/or a home appliance control system. The window control system and the at least one other system are configured to communicate via an application programming interface (API). The window control system is configured to control the optical state of one or more optically switchable windows.

In certain embodiments, the window control system includes a window controller configured to control transitions of at least one optically switchable window. In certain embodiments, the window control system includes a plurality of electrochromic windows in electrical communication with one or more window controllers configured to communicate over a network.

In certain embodiments, the at least one other system is the home appliance control system. In certain embodiments, the at least one other system is the HVAC system. In some implementations, the interacting systems additionally include a building management system configured to control the HVAC system. In such cases, the API may be configured to permit the window control system and the building management system to communicate. In certain embodiments, the at least one other system is the lighting system.

In some implementations, the window control system and the at least one other system are configured to provide data obtained or generated by the window control system to the at least one other system. In some implementations, the window control system and the at least one other system are configured such that the window control system controls one or more devices of the at least one other system.

In certain embodiments, the window control system and the at least one other system are configured such that the at least one other system controls one or more devices of the window control system. In such embodiments, the at least one other system is the HVAC system or the lighting system. As an example, the devices of the window control system include a sensor and/or an optically switchable window.

Another aspect of this disclosure pertains to methods of communicating among a plurality of interacting systems, which may be a window control system and at least one other system selected from the group consisting of a lighting system, an HVAC systems, a security system, and a home appliance control system. In some embodiments, the method is characterized by the following operations: (a) receiving a communication from the window control system or from the at least one other system and addressed to the other of the window control system and the at least one other system, wherein the communication has a format specified by an applications program interface (API) for communicating between the window control system and the at least one other system; (b) providing instructions and/or data contained in the communication to the addressed window control system or at least one other system; and (c) performing, at the addressed window control system or at least one other system, one or more operations using the instructions and/or data contained in the communication.

In certain embodiments, the window control system includes a window controller configured to control transitions of at least one optically switchable window. The window control system may also include a plurality of electrochromic windows in electrical communication with one or more window controllers configured to communicate over a network.

In certain embodiments, the at least one other system is the home appliance control system. In certain embodiments, the at least one other system is the HVAC system. In some such embodiments, a building management system is configured to control the HVAC system, and the HVAC system receives the communication from the window control system via the API. In certain embodiments, the at least one other system is the lighting system.

In some implementations, the at least one other system receives the communication from the window control system, and the communication includes data obtained or generated by the window control system. In some implementations, the at least one other system receives the communication from the window control system, and the communication includes instructions from the window control system for controlling one or more devices of the at least one other system.

In some implementations, the window control system receives the communication from the at least one other system, and the communication includes instructions from the at least one other system for controlling one or more devices of the window control system. As an example, the devices controlled on the window control system include a sensor and/or an optically switchable window. As further examples, the at least one other system is the HVAC system and/or the lighting system.

These and other features and advantages will be described in further detail with reference to the associated drawings.

DETAILED DESCRIPTION

Figure 1A:
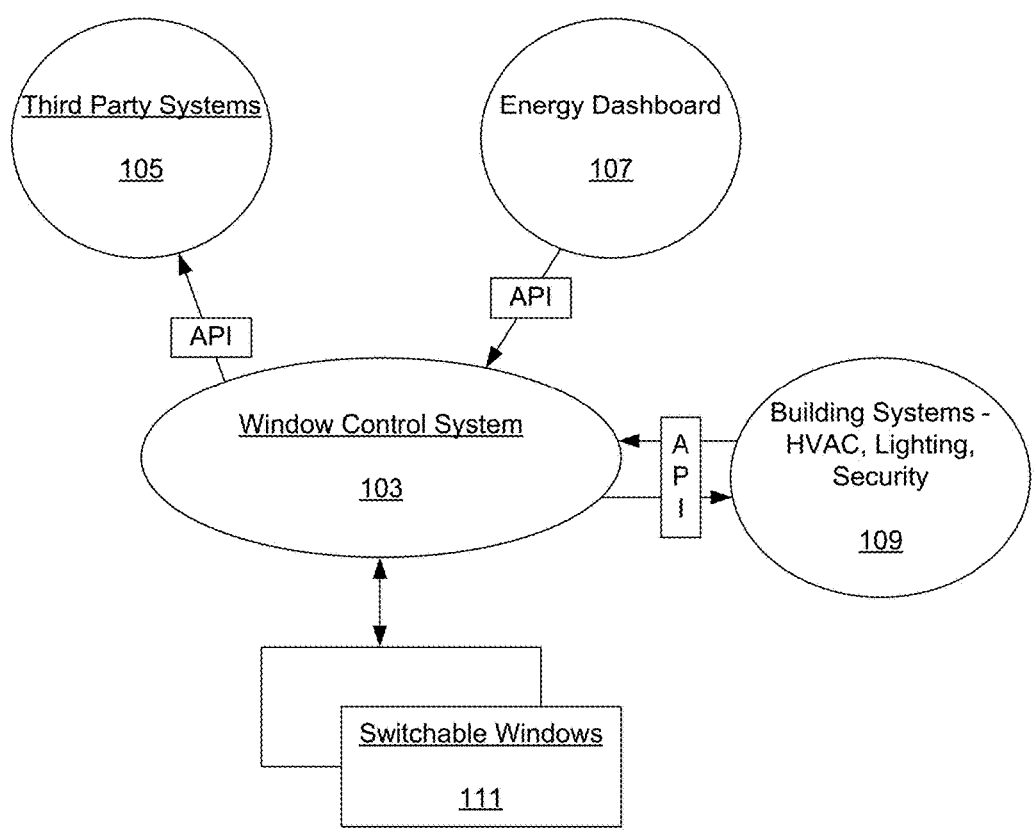
FIG. 1A is a block diagram of interacting systems, including a window system, interfacing with one another via APIs.

This document describes, inter alia, a platform for communicating among one or more otherwise independent systems involved in controlling functions of buildings or other sites having switchable optical devices deployed therein. Such independent systems include a window control system and one or more other independent systems such as systems that control residential home products (e.g., NEST (Nest Labs of Palo Alto, Calif.), which controls thermostats, smoke alarms, etc.), HVAC systems, security systems, lighting control systems, and the like. Together the systems control and/or monitor multiple features and/or products, including switchable windows and other infrastructure of a site, which may be a commercial, residential, or public site. Networks and related infrastructure that may be used with the disclosed embodiments are presented in FIGS. 1A-E, as well as in U.S. Provisional Patent Application No. 62/085,179, filed Nov. 26, 2014, and in U.S. patent application Ser. No. 14/951,410, filed Nov. 24, 2015, both incorporated herein by reference in its entirety.

In some cases, a site has one or more controllers that control the switching of one or more deployed devices. The site may also have sensors such as light sensors, thermal sensors, and/or occupancy sensors that provide data used in making decisions about when and by how much to switch the devices. In certain embodiments, the site employs switchable optical devices such as electrochromic devices on structures such as windows and/or mirrors. In the description that follows, switchable optical devices are often referred to as "windows" or "electrochromic windows". It should be understood that such terms include structures other windows that have switchable optical devices. Further, the switchable devices are not limited to electrochromic devices, but include such other switchable devices as liquid crystal devices, electrophoretic device, and the like, which may be non-pixelated.

Typically, one of the interacting systems is a window control network. The interacting systems of a site may use sensor output or other information of one system to make decisions about the operation of a different system. Further, a system may analyze information it collects from a site (or sites) to provide control instructions or other instructions for a different system. One system may, if appropriate, control the functioning of elements on a different system. For example, a window network control system may send instructions to a lighting system and/or a HVAC system to adjust the lighting level or air conditioning level in a room or zone where the window system controls tint levels of windows. To permit the independent systems to interact they may need to express their properties and/or functions via Application Programming Interfaces (APIs).

Systems employ APIs to allow external systems to access data and/or functioning that is otherwise opaque to the external systems. APIs provide syntax and a portal to permit the access. For example, an API for a window control system may allow access to window sensor data (e.g., temperature) through a URL, user name, and handshake. HomeKit compliant definitions provide APIs for controlling Apple (Apple Inc. of Cupertino, Calif.) home appliances and Thread compliant definitions provide APIs for controlling appliances of many other technology companies including NEST and Samsung (Samsung Group of Seoul, South Korea). Thread and HomeKit define standard connection protocols for messaging.

Terminology

An "optically switchable device" or "switchable optical device" is a thin device that changes optical state in response to electrical input. It reversibly cycles between two or more optical states. Switching between these states is controlled by applying predefined current and/or voltage to the device. The device typically includes two thin conductive sheets that straddle at least one optically active layer. The electrical input driving the change in optical state is applied to the thin conductive sheets. In certain implementations, the input is provided by bus bars in electrical communication with the conductive sheets.

Examples of optically switchable devices include electrochromic devices, certain electrophoretic devices, liquid crystal devices, and the like. Optically switchable devices may be provided on various optically switchable products, such as windows, mirrors, displays, and the like. In certain embodiments, these products are typically provided in a non-pixelated format.

An "optical transition" is a change in any one or more optical properties of an optically switchable device. The optical property that changes may be, for example, tint, reflectivity, refractive index, color, etc. In certain embodiments, the optical transition will have a defined starting optical state and a defined ending optical state. For example the starting optical state may be 80% transmissivity and the ending optical state may be 50% transmissivity. The optical transition is typically driven by applying an appropriate electric potential across the two thin conductive sheets of the optically switchable device.

A "starting optical state" is the optical state of an optically switchable device immediately prior to the beginning of an optical transition. The starting optical state is typically defined as the magnitude of an optical state which may be tint, reflectivity, refractive index, color, etc. The starting optical state may be a maximum or minimum optical state for the optically switchable device; e.g., 90% or 4% transmissivity. Alternatively, the starting optical state may be an intermediate optical state having a value somewhere between the maximum and minimum optical states for the optically switchable device; e.g., 50% transmissivity.

An "ending optical state" is the optical state of an optically switchable device immediately after the complete optical transition from a starting optical state. The complete transition occurs when optical state changes in a manner understood to be complete for a particular application. For example, a complete tinting might be deemed a transition from 75% optical transmissivity to 10% transmissivity. The ending optical state may be a maximum or minimum optical state for the optically switchable device; e.g., 90% or 4% transmissivity. Alternatively, the ending optical state may be an intermediate optical state having a value somewhere between the maximum and minimum optical states for the optically switchable device; e.g., 50% transmissivity.

"Bus bar" refers to an electrically conductive strip attached to a conductive layer such as a transparent conductive electrode spanning the area of an optically switchable device. The bus bar delivers electrical potential and current from an external lead to the conductive layer. An optically switchable device includes two or more bus bars, each connected to a single conductive layer of the device. In various embodiments, a bus bar forms a long thin line that spans most of the length of the length or width of a device. Often, a bus bar is located near the edge of the device.

"Applied Voltage" or $V_{app}$ refers the difference in potential applied to two bus bars of opposite polarity on the electrochromic device. Each bus bar is electronically connected to a separate transparent conductive layer. The applied voltage may different magnitudes or functions such as driving an optical transition or holding an optical state. Between the transparent conductive layers are sandwiched the optically switchable device materials such as electrochromic materials. Each of the transparent conductive layers experiences a potential drop between the position where a bus bar is connected to it and a location remote from the bus bar. Generally, the greater the distance from the bus bar, the greater the potential drop in a transparent conducting layer. The local potential of the transparent conductive layers is often referred to herein as the $V_{TCL}$. Bus bars of opposite polarity may be laterally separated from one another across the face of an optically switchable device.

"Effective Voltage" or $V_{eff}$ refers to the potential between the positive and negative transparent conducting layers at any particular location on the optically switchable device. In Cartesian space, the effective voltage is defined for a particular x,y coordinate on the device. At the point where $V_{eff}$ is measured, the two transparent conducting layers are separated in the z-direction (by the device materials), but share the same x,y coordinate.

"Hold Voltage" refers to the applied voltage necessary to indefinitely maintain the device in an ending optical state.

Figure 3:
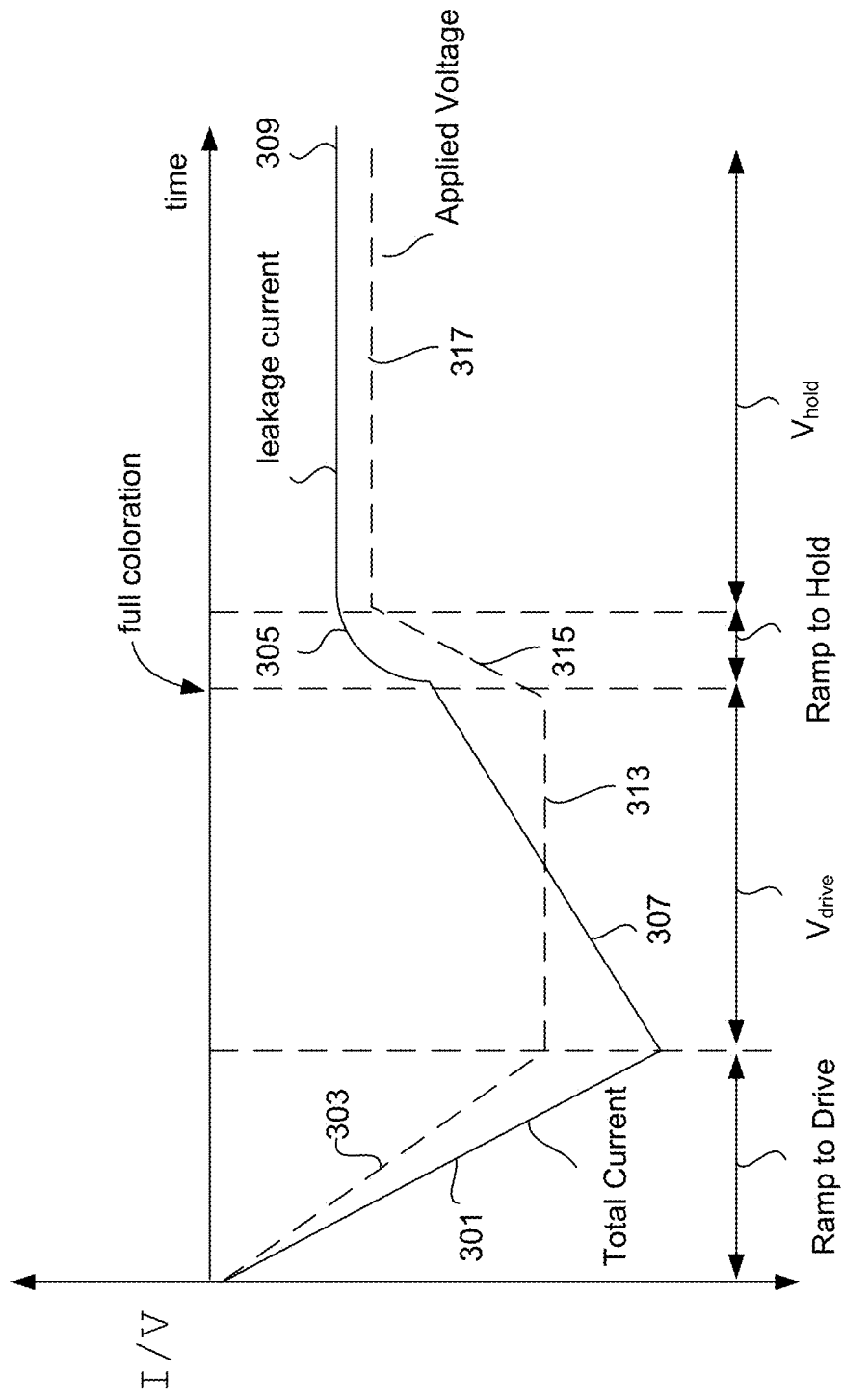
FIG. 3 is a graph depicting certain voltage and current profiles associated with driving an electrochromic device from bleached to colored.

"Drive Voltage" refers to the applied voltage provided during at least a portion of the optical transition. The drive voltage may be viewed as "driving" at least a portion of the optical transition. Its magnitude is different from that of the applied voltage immediately prior to the start of the optical transition. In certain embodiments, the magnitude of the drive voltage is greater than the magnitude of the hold voltage. An example application of drive and hold voltages is depicted in FIG. 3.

A window "controller" is used to control the tint level of the electrochromic device of an electrochromic window. In some embodiments, the window controller is able to transition the electrochromic window between two tint states (levels), a bleached state and a colored state. In other embodiments, the controller can additionally transition the electrochromic window (e.g., having a single electrochromic device) to intermediate tint levels. In some disclosed embodiments, the window controller is able to transition the electrochromic window to four or more tint levels. Certain electrochromic windows allow intermediate tint levels by using two (or more) electrochromic lites in a single IGU, where each lite is a two-state lite.

In some embodiments, a window controller can power one or more electrochromic devices in an electrochromic window. In certain embodiments, this function of the window controller is augmented with one or more other functions such as antenna transceiver functionality and/or other functions described below. Window controllers described herein may provide power to switch the optical state of a device. For example, the controller has its own power source and directs application of power from the window power source to the window. In other embodiments, the power source for the optically switchable device may be separate from the window controller. However, it is convenient to include a power source with the window controller and to configure the controller to power the window directly, because it obviates the need for separate wiring for powering the electrochromic window.

Further, the window controllers described herein are described as standalone controllers which may be configured to control the functions of a single optically switchable window or a plurality of such windows, without integration of the window controller into a network such as a building control network or a building management system (BMS). Window controllers, however, may be integrated into a building control network or a BMS.

Window Control Network—

A window control network controls multiple optical switchable devices such as windows in a site and accesses and/or maintains data relevant to controlling the windows. It may receive data about the switchable optical devices and associated controllers and sensors at one or more sites, and from this data, make decisions about switching the devices. It may send data and/or control messages to the windows on the site(s). It may also detect and/or present potential problems, identify trends in the performance of devices and/or controllers, modify algorithms for controlling the switchable optical devices, etc. In disclosed embodiments, a window control network interacts with other systems. Window control networks are further described below, including the description of FIGS. 1A-D. Various examples of window control networks suitable for use with this disclosure include those described in U.S. Pat. No. 8,705,162, filed Apr. 17, 2012, U.S. patent application Ser. No. 14/951,410, filed Nov. 24, 2015, and U.S. Provisional Patent Application No. 62/248,181, filed Oct. 29, 2015, each incorporated herein by reference in its entirety. A window control network may be considered to be a type of window control system, which may include a single controller and/or window, without network infrastructure.

Site—

This is the building or other location of installed switchable optical devices. The switchable devices are provided in a network and operated under the control of one or more algorithms that collectively make up a window control system. Transitions from one optical state to another may be dictated by programs or logic such as that described in U.S. patent application Ser. No. 13/772,969, filed Feb. 21, 2013, which is incorporated herein by reference in its entirety. A site may have other systems that communicate with the window control network. Examples of the other systems include lighting systems, HVAC systems, fan systems, security systems, and smart thermostat service or other home appliance service. In some cases, the other system is a user-customizable interface for controlling devices in one a plurality of systems. For example, a user may have window tinting, room temperature, and lighting preferences that attach for the user. Such preferences may be triggered by the user's manual input, e.g., via a mobile device, or a system detecting the user's proximity, e.g., through communication with the user's worn digital sensor or smart mobile phone when the user enters a room or zone. Examples of sites include residential buildings, office buildings, schools, airports, hospitals, government buildings, etc. Its rooms may have network controlled thermostats such as those provided by NEST.

FIG. 1A shows a window control system 103, and associated windows 111, and other systems associated with a site. The figure illustrates the multiple interacting systems and the interfaces between them. As mentioned, the other systems that interface with the window system 103 include third party systems 109 such as HVAC systems, security systems, and lighting systems. Window control system 103 may also interface with building control service entities 105 such as NEST. Still further, system 103 can interface with third party dashboards 107, which may be used by consultants, etc. to present monitoring and/or performance information about one or more sites. The services provided by any of these systems (103, 105, 107, and 109) may be hosted at any of various locations. For example, they may be hosted locally on an internal server and associated database or they may be hosed externally on a leased or owned virtualized collection of servers (e.g., a cloud-based service). FIG. 1A shows the logical positions at which APIs may exist between the entities. Firewalls can exist at any of these locations. In various embodiments, "third party systems," the "building control service entities," and the "dashboards" are systems that are controlled by entities other than the entity that controls the window control system. However, this is not necessarily case. A third party system may simply be a system that has its own physical and/or logical infrastructure that is wholly or partially separate from the infrastructure(s) of the window control network.

APIs for Window Control Systems

In some embodiments, APIs allow external systems to view data collected by the window system. This includes data directly collected by the window system and also includes information relevant to the external systems and derived by the window system from the raw data it collects.

In some embodiments, APIs allow the window control system to access and control third-party systems. For example, a lighting control system may provide an API that under certain conditions allows the window control system to access the lighting control system. In some implementations, the window control system employs associated heuristics that permit or trigger the window control system to control aspects of the external system via an API.

In some embodiments, APIs allow external systems to control aspects of a window control system such as tinting of windows in a particular zone. As with the prior case, there may be particular conditions that trigger the allowance of the external system to access the functionality of the window control system.

In general API interface is deployed or executes on a device or system remote from the window controller of a window control system. For example, the API may execute at the cloud level or master controller level in window control network. However, this need not be the case, and in fact, it may be desirable to have the API execute at the window controller (or have the window controller contain fail over API processing capability) to maintain inter-system communications in the event of loss of window network functionality. In such implementations, the local window controller(s) can locally communicate with third party systems and maintain comfort and service for an occupant.

Examples of APIs for Window Control Systems

1. A window control system provides raw collected information and/or processed information derived from the raw information to an interfacing system:

a) Sent information may include sensed data, predicted events, and site and device product and set up information.

b) Examples (any of these by window, zone, façade, side of a building or other site):

Temperature—interior or external
Sensed solar irradiance—directional
Interior photosensors—glass or mullion
Solar heat gain,
Occupancy—IR, motion,—number of persons in the room
Solar calculator (angle, intensity)—azimuthally, inclination
Weather—cloud cover
Snow on the ground—frozen lake
Site and device set up information—Examples follow:
  GET/sites present metadata about sites, including applicable ip addresses
  GET/site/{ site_id} presents metadata about a specific site and the zone groups and zones within that site
  GET/zone/{zone_id} presets information about a specific zone, what devices and services are available, etc.

c) The interfacing system receiving this information may use this information to make decisions for controlling and otherwise managing its own equipment (not windows).

d) The interfacing system can present this information in its own dashboard.

e) The set up information enables peer interfacing systems to provide services within the context of the window zones that the site owner has invested in setting up. For example, the site owner can set up zone information once and use the same zones in controlling lighting, heating, home appliances, etc. Zones for window control systems are described further in the context of PCT Patent Application No. PCT/US13/36456, filed Apr. 12, 2013, and incorporated herein by reference in its entirety.

2. The window control system provides its own window tinting information (current and/or future) to an interfacing system:

a) E.g., the window network will increase tint in the windows of zone Z by 30% at time X. The transition will take time T.

b) The information can be provided per zone or with other set up information about the site. This aspects of 1 (e) apply.

c) The interfacing system receiving this information may use this information to make decisions for controlling and otherwise managing its own equipment (not windows).

d) The interfacing system can present this information in its own dashboard.

3. A window control system provides value added content to an interfacing system:

a) The window network uses its available information such as sensor data and current and future tint levels (per window, zone, etc.) to determine value added content useful to interacting, non-window, systems.

b) Examples of such content include:

For HVAC, the amount of energy coming through the façade as sensed and/or predicted with a solar calculator. Granularity (per floor, per direction)—based on time as well. Calculate number of BTUs that they need to provide. Heating/cooling BTUs required for a façade or window opening.

For a smart home appliance service—provide temperature gradient determined from temperature at thermostat and temperature at a window. Large difference might suggest that the interfacing system needs to bump up the heating (or cooling) for comfort.

For a lighting control systems—provide suggested lighting levels determined by, e.g., how much light from windows and at what direction, solar calculator, environmental conditions (clouds, snow, reflection), occupancy, user initiated tinting decisions, etc.

c) The interfacing system receiving this information may use this information to make decisions for controlling and otherwise managing its own equipment (not windows).

d) The interfacing system can present this information in its own dashboard.

4. The window control system exposes its functionality:

a) An interfacing system, such as a smart home appliance control service, a lighting system, or a security system may make tinting decisions based on its own needs and/or may send window tint level commands to the window network (without BACnet)

b) Home automation example—the window control system allows a smart thermostat (or other home appliance) service (e.g., NEST) to control of window tinting. This may be based on time of day, occupancy, and other types of information that the smart home appliance service has and uses. Similarly, embodiments allow remote control of thermostat and tinting. Embodiments allow vacation mode in an external service to clear windows and allow in light to reduce likelihood of pipes freezing. Embodiments allow a security company to darken home windows at certain times, and allow lights come on. Embodiments allow clearing of windows at 10 PM so neighbors can see in the house.

c) Security/occupancy example—a window control system allows control of our window system such as dark in lock down and clear in a burglary.

d) The window control functionality can be exposed per zone or with other set up information about the site. This aspects of 1 (e) apply.

5. A window control system controls the equipment of an interfacing system:

a) For example, a lighting or air conditioning system gives the window control system permission to control lighting or air conditioning based on tinting/clearing decisions.

Heat is generated by electrical equipment such as televisions, computers, and office equipment. Sensing plug loads (office equipment, etc.) may be enabled by the site providing load sensors (real-time power monitors for each area of interest). These sensors may be part of the HVAC or lighting system. In certain embodiments, the window control systems accesses devices from such systems (via an API) and gathers information from them, then combines that information with other data it collects and uses the result to control the interfacing system's devices. For example the window system may read plug loads and combine it with the incident energy striking the façade and the current HVAC heating/cooling BTUs to optimize energy use in that location.

b) Examples providing control over networked thermostat:

The window control system instructs the thermostat to back off air conditioning when the window system has reduced or will begin reducing heat load through window tinting.

Sensors in window control system detect occupancy by, e.g., BLE (Blue Tooth Low Energy) beacons deployed in window controllers and/or wall interfaces. With this information, the window control system instructs a thermostat to change its mode from away mode to home mode.

c) The window control system may exercise the control by making calls to the interfacing system's API (e.g., a thermostat control API). Alternatively, the interfacing system may subscribe to the window control system's API, and based on information provided from the window control system take action.

6. A user-customizable system interfaces with the window control system and other peer systems. The user-customizable system presents a user's preferences to control devices on site systems and causes them to enter states pre-defined by the user.

a) For example, a user may have window tinting, room temperature, and lighting preferences that attach for the user.

b) Such preferences may be triggered by the user's manual input, e.g., via a mobile device, or a system detecting the user's proximity, e.g., through communication with the user's worn digital sensor or smart mobile phone when the user enters a room or zone.

Window Control Systems

Figure 1B:
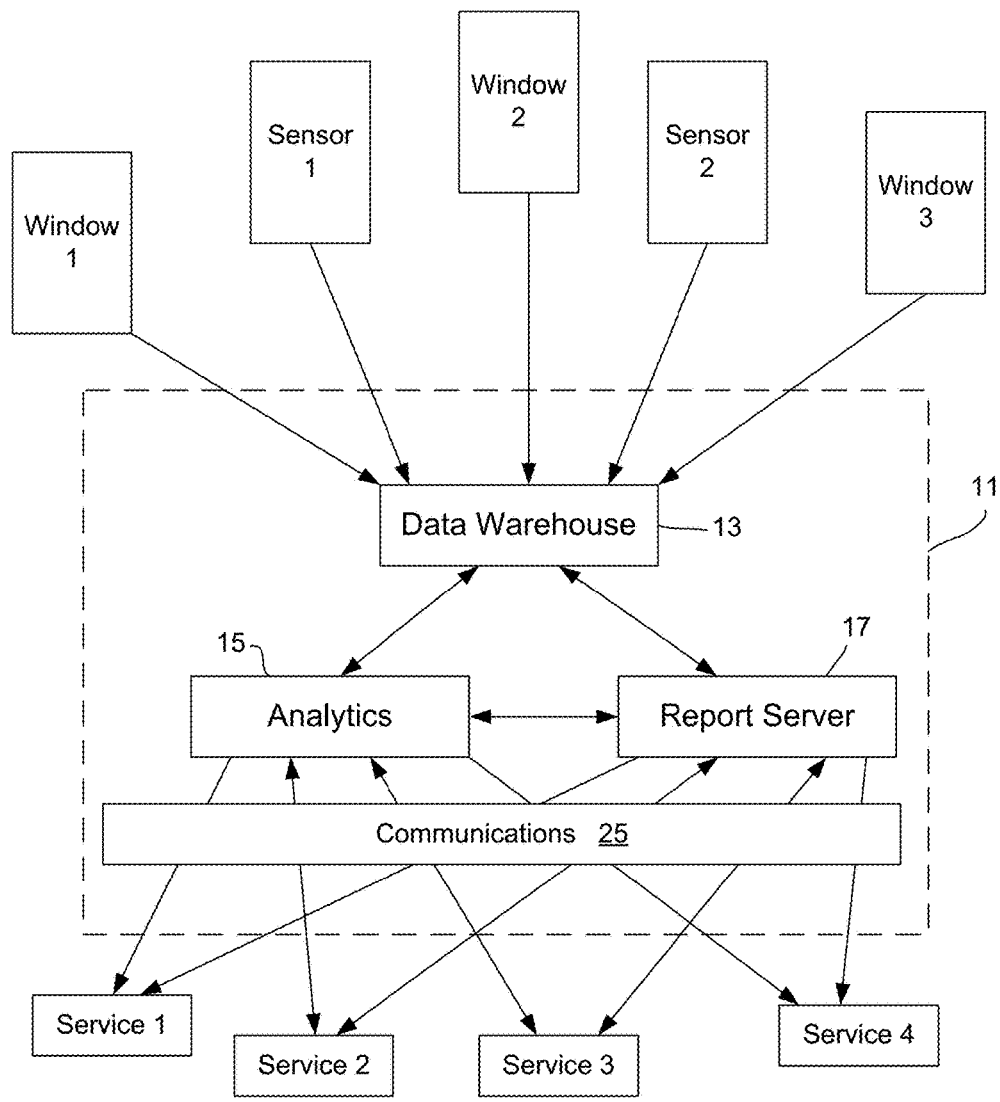
FIG. 1B is a block diagram of a smart window system for interfacing with external systems.

One example of a window system appropriate for interfacing with other systems is depicted in FIG. 1B. As shown there, the interfacing logic of a window system 11 interfaces with multiple window controllers (1-3), sensors (1-2), and optionally other infrastructure associated with the switchable windows and controllers. The system 11 may access the window controllers, sensors, and other infrastructure via a window controller network, which may be configured as described elsewhere herein. The system 11 also interacts with multiple external systems or services 1-4 (e.g., a smart home appliance network service (e.g., NEST) or HVAC system) accessible through workstations, portable computers, mobile devices such as smartphones, and the like, each able to send and/or receive information relevant to its function. In some implementations, a service or system may be permitted access to only a subset of the information available to the window system.

System 11 may be implemented in various hardware and/or software configurations. In the depicted embodiment, system 11 includes a data warehouse 13, an analytics server 15, and a report server 17. In the depicted example, the data warehouse interfaces directly with the window controllers and/or sensors by, e.g., a window control network containing a hierarchy of controllers are described below with reference to FIGS. 1C-E. The data warehouse stores data from these features in a relational database or other data storage arrangement. In one embodiment, the data is stored in database or other data repository such as an Oracle DB, a Sequel DB, or a custom designed database. Data warehouse 13 may obtain information from any of a number of sensor and controller types such as those described elsewhere herein. In the depicted embodiment, analytics server 15 and report server 17 interface with the external systems to provide services and reports, respectively. In one embodiment, the report server runs Tableau, Jump, Actuate (Open Text), or a custom designed report generator. In the depicted embodiment, data warehouse 13 and analytics server 15 each provide information to report server 17. Communication between data warehouse 13 and analytics server 15 is bidirectional. The interface with the external services and/or systems may be made via a communications interface 125 configured with logic for using APIs for each of the external services/systems. Depending on the respective requirements of the window intelligence system 11 and the external systems/services, the communications between them may be bidirectional or monodirectional. The window intelligence system may interface with the external systems/services via a wireless connection or a cable connection implemented in communications block 125.

Figure 1C:
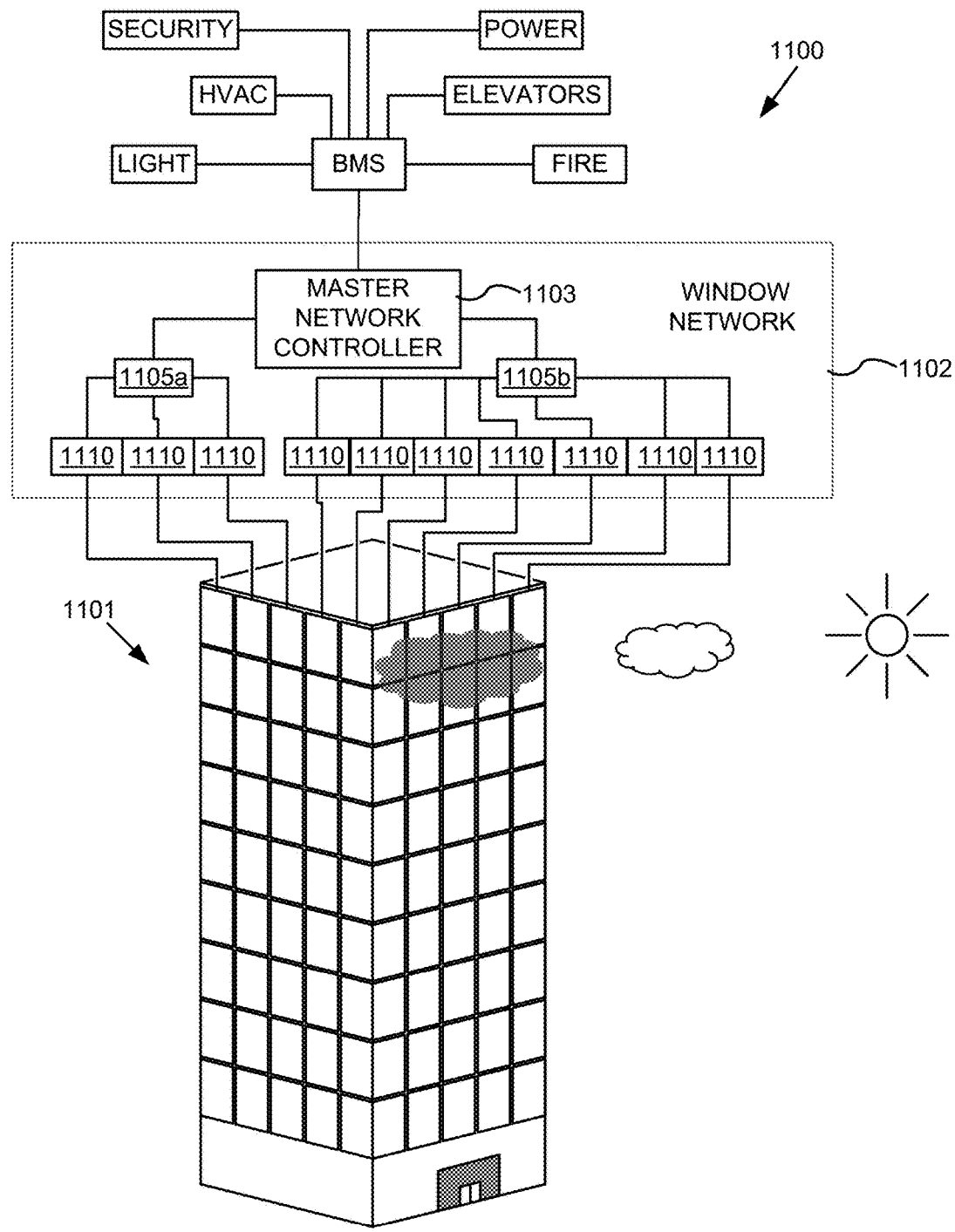
FIG. 1C depicts a schematic diagram of an embodiment of a site with a building management system (BMS) for interacting with a window control network.
Figure 1D:
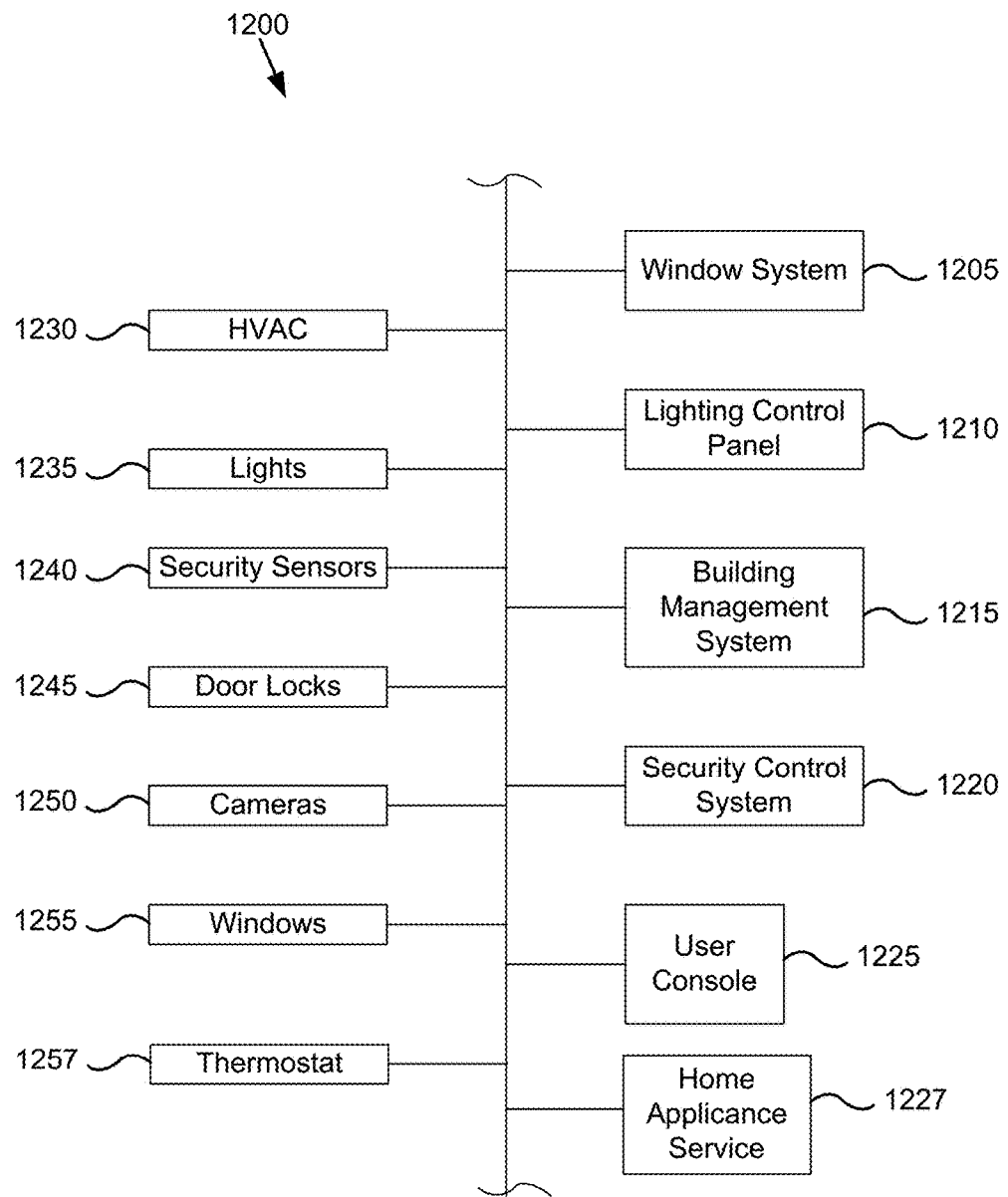
FIG. 1D depicts a block diagram of a building network.
Figure 1E:
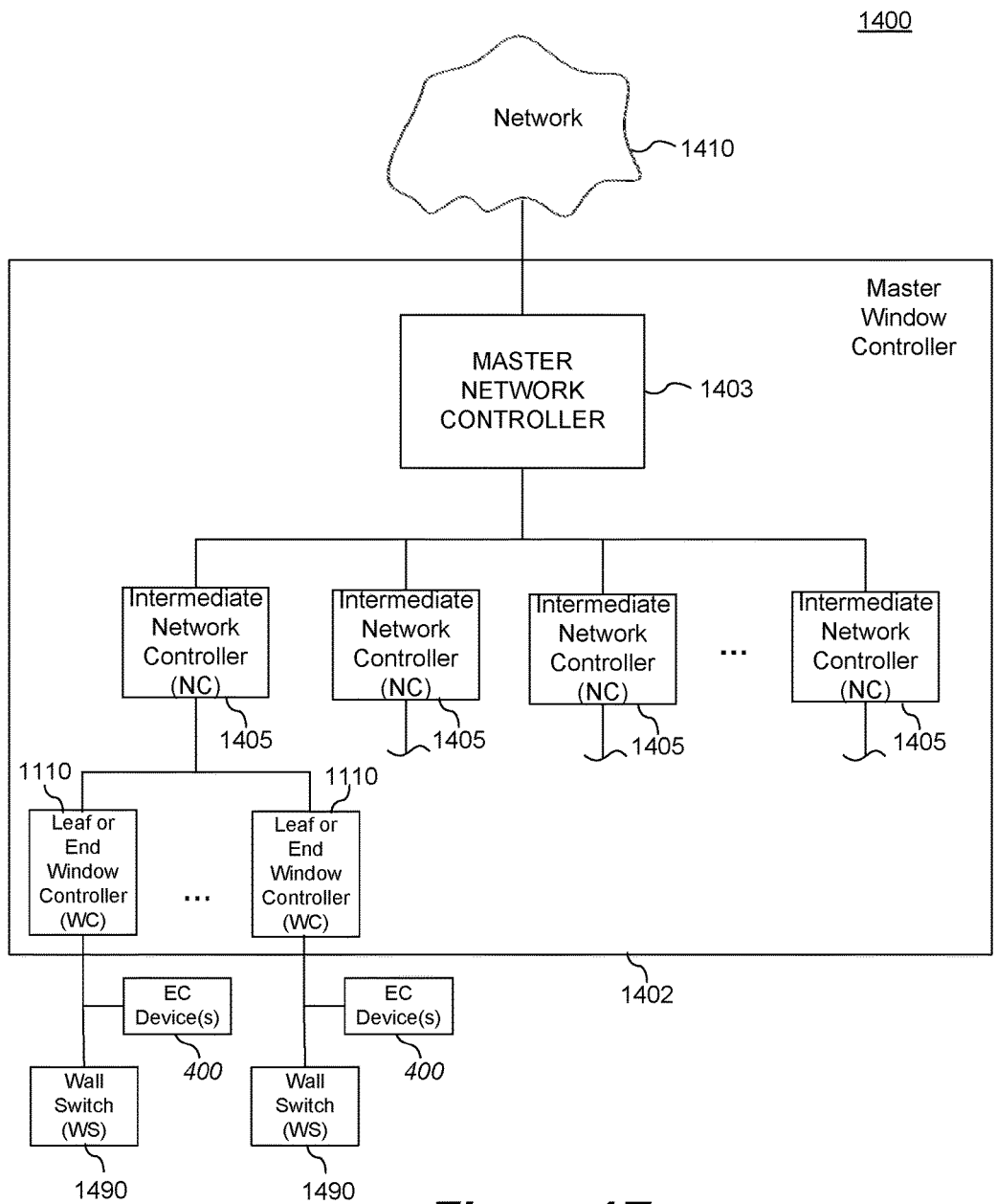
FIG. 1E is a diagram of components of a window network for controlling functions of one or more tintable windows of a building.

Examples of window network configurations are shown in FIGS. 1C-E and discussed below. Typically, a window network systems will include multiple switchable optical devices, each directly controlled by a controller, multiple sensors such as illumination sensors, and one or more higher level controllers such as network controllers and master controllers.

In certain embodiments, the window intelligence system 11 is implemented in the "cloud". The system can be centralized or distributed and can be accessed from anywhere using client application by authorized personnel. The various components of the system may be located together or apart in one or more sites, a location remote from all sites and/or in the cloud. Additional features, functions, modules, etc. of the system 11 may include a data and event reporter and a data and event log and/or a database.

Through monitoring of the sensors and controllers, a window intelligence system may provide many types of services such as any one or more of the following services:

a. Customer service—the system can be configured to note when data from a switchable device, a sensor, and/or a controller indicates a problem in an external system. In response, service personnel may be summoned to correct the problem or communicate that there is a problem. In some instances, potential issues are flagged and resolved before they become apparent to the external system. The window system may be configured to autocorrect problems with external systems. Unless stated otherwise, any of the problems, issues, errors, etc. described herein can be autocorrected using heuristics in the window control system. Alert notifications may be sent when issues are detected. The system may also provide look ahead data to external systems such as HVAC systems, thereby enabling such systems to enhance user comfort and/or save energy.

b. Customize the installation based on observed usage trends. User preferences may be incorporated in a program over time. As an example, the window system may determine how an end user (e.g. occupant) tries to override a heating or lighting control algorithm at particular times of day and uses this information to predict future behavior of the user. It may inform the relevant external system and/or modify the window control algorithm to set tint levels according to the learned user preference.

c. Deploy learned approaches to other external systems or installations (e.g., how to best tint windows, light windows, heat/cool rooms when an afternoon thunderstorm approaches). There are benefits achieved in using the collective experience and information from an installed base of switchable device networks. For example, it helps to fine tune control algorithms, customize window/network products for a particular market segment, and/or test new ideas (e.g., control algorithms, sensor placement).

d. Energy consulting services. Such services may use information about a building such as energy consumption of a building, window tinting decisions, solar radiation flux (e.g., on different sides of a building), local weather information (cloud cover, temperature, etc.), etc. Such information may be provided in various time increments, e.g., months, weeks, days, hours, minutes, etc. Energy consulting services may use such information in developing analyses and/or recommendations for the building(s) from which the information was obtained and/or similar building (e.g., nearby buildings, buildings in similar climates, or at similar latitudes). Also, energy consulting services may use the information to provide analyses and/or recommendations to energy infrastructure entities such as utilities, HVAC equipment suppliers, campuses, entities that provide control services to power grids, etc.

e. Vendors who market information. Some vendors integrate information from various sources and bundle useful tags customized to buyer needs.

Data Monitored

The following description presents examples of some types of site information that may be monitored by a window system. The information may be provided from various sources such as voltage and/or current versus time data for individual switchable devices, sensor output data versus time, communications and network events and logs for controller networks, etc. The time variable may be associated with external events such as solar position, weather, etc., as well as time of day or calendar day. Information with a periodic component may be analyzed in the frequency domain as well as the time domain.

1. From window controllers I/V data:

a. Changes in peak current. This is sometimes produced during application of a ramp to drive voltage for producing an optical transition. See FIGS. 2 and 3.

b. Changes in hold (leakage) current. This may be observed at an end state of a switchable device. A rate of increasing leakage current may correlate with the likelihood that a short has developed in the device. Sometimes a short causes an undesirable blemish such as a halo in the device.

c. Change in voltage compensation required. Voltage compensation is the change in voltage required to account for the voltage drop in the conductive path from the power supply to the switchable device.

d. Change in total charge transferred. This may be measured over a period of time and/or during a certain state of the switchable device (e.g., during drive or during hold).

e. Change in power consumption. Power consumption may be calculated by (I*V) per window or controller.

f. Comparison with other WC (window controllers) on the same façade with identical loads. This allows the monitoring system to determine that a particular controller has an issue, rather than a particular device controlled by the controller. For example, a window controller may be connected to five insulated glass units, each exhibiting the same issue. Because it is unlikely that five devices will all suffer from the same issue, the monitoring system may conclude that the controller is to blame.

g. Instances of abnormal profiles: e.g., double tinting/double clearing. Double tinting/clearing refers to a situation where a normal drive cycle (voltage and/or current profile) is applied and it is found that the switchable device has not switched, in which case a second drive cycle must be conducted.

h. Switching characteristics vs. external weather. At certain temperatures or weather conditions, the monitoring system expects particular switching results or performance. Deviations from the expected response suggest an issue with a controller, a switchable device, and/or a sensor.

The changes and comparisons described here can be produced from data collected at, e.g., the network controller level. Historical data (days, weeks, months, years) is preserved in the window intelligence system, and such data can be used for comparison. With such data, variations due to temperature can be identified and ignored, if appropriate. The various changes, along or in combination, may provide a signature of a problem in a window, a controller, a sensor, etc. Any one or more of the foregoing parameters may identify an increase in impedance at any position from the power supply to (and including) the switchable device. This path may include the switchable device, a bus bar connected to the device, a lead attach to the bus bar, a connector to the lead attach or IGU, a group of wires (sometimes called a "pigtail") between the connector (or IGU) and the power supply. As an example, a change in any or more of parameters 1a-1e may indicate corrosion caused by water in a window frame. A model using a combination of these parameters may recognize the signature of such corrosion and accurately report this issue remotely.

2. From window controller state and zone state changes:
 a. Any window controller getting out of sync with zone—may be due to communication issues. Example: If there are multiple controllers in a zone, and one of these controllers does behave as expected, the window system may conclude that the aberrant controller is not receiving or following commands over a communications network. The system can take action to isolate the source of the problem and correct it.
 b. Longest switching time for the zone and adjustments to make all glass switch at the same rate. The system may identify a particular switchable device that is not switching at a desired rate or an expected rate. Without replacing or modifying the device, the window system may modify the switching algorithm so that the device switches at the expected rate. For example, if a device is observed to switch too slowly, its ramp to drive or drive voltage may be increased. This can be done remotely.

3. From system logs:
 a. Any change in frequency of communication errors—increase in noise or device degradation. The received communications from a controller may be slowed or stopped. Or, the send communications may not be acknowledged or acted upon.
 b. Connection degradation if pigtail starts showing up as disconnected. In certain embodiments, a connector provides a signal indicating that it is becoming disconnected. A window controller may receive such signals, which can be logged at the window system.

4. From sensor data:
 a. Any degradation over time. This may be manifest as a signal magnitude reduction. It may be caused by various factors including damage to the sensor, dirt on the sensor, an obstruction appearing in front of the sensor, etc.
 b. Correlation with external weather. Normally, the window system will assume that the photo sensor output should correlate with the weather.
 c. Comparison with zone state change to ensure Intelligence working correctly. The window system normally expects that the zone will change state when its photosensor output meets certain state-change criteria. For example, if the sensor indicates a transition to sunny conditions, the switchable devices in the zone should tint. In certain embodiments, there are one or more photosensors per zone.
 d. Any changes in surroundings after commissioning. As an example, a tree grows in front of the sensor or a building is constructed in front of a sensor. Such changes in surroundings may be evidenced by multiple sensors affected by the changes being similarly affected (e.g., their photo sensor outputs go down at the same time). Among other purposes, commissioning provides information about the deployment of sensors, controllers, and/or switchable optical devices in a site. Commissioning is further described in PCT Application No. PCT/US2013/036456, filed Apr. 12, 2013, which is incorporated herein by reference in its entirety.
 e. Data from a central or multifunctional sensor. In some embodiments, a building has a multifunctional sensor providing sensed data for a variety of parameters relevant to window tinting or other building management. Examples of individual sensors that may be included in such multifunctional sensor include temperature sensors, directional photosensors (e.g., three or more photosensors oriented in different azimuthal and/or altitudinal directions), humidity sensors, etc. The photosensors may capture visible light, IR radiation, UV radiation, or any combination thereof. In certain embodiments, the multifunctional sensor provides weather related data. In one example, the sensor is a ring sensor as described in U.S. Patent Application No. 62/238,100, filed Oct. 6, 2015, and incorporated herein by reference in its entirety.

5. From log file analysis of driver of state changes:
 a. Overrides by zone—further tuning of control algorithms for the zone. The window system may learn the requirements of a particular site and adapt its learning algorithm to address the requirements. Various types of adaptive learning are described in PCT Application No. PCT/US2013/036456, filed Apr. 12, 2013, which was previously incorporated herein by reference in its entirety.
 b. iOS vs. Wall Switch overrides—consumer preference. When overrides are observed, the monitoring system may note which type of device initiated the override, a wall switch or a mobile device. More frequent use of wall switches may indicate a training issue or a problem with the window application on the mobile device.
 c. Time/Frequency of various states—usefulness of each state. When multiple tint states are available, and some are underused, it may indicate to the remote monitoring system that there is an issue with a particular state. The system may change the transmissivity or other characteristic of the state.
 d. Variation by market segment. The frequency of use (popularity) of certain states or other properties of a site's switching characteristics may correlate with a market segment. When a window system learns this, it may develop and provide market-specific algorithms. Examples of market segments include airports, hospitals, office buildings, schools, government buildings, etc.
 e. Total number of transitions—Expected number of cycles over warranty period and life by market segment. This may provide in situ lifecycle information.

6. Energy calculations:
 a. Energy saved by zone by season, total system energy saving by season. The window system may determine energy savings to identify algorithms, device types, structures, etc. that provide improvements. Provide performance information and recommendations to external systems such as HVAC systems and smart thermostat service or other home appliance services (e.g., NEST).
 b. Provide advanced energy load information to AC system by zone. Buildings have large thermal masses, so air conditioning and heating do not take effect immediately. Using a solar calculator or other predictive tools (describe elsewhere herein), the window system can provide advance notice to HVAC systems or NEST so they can begin a transition early. It may be desirable to provide this information by zone.

7. Window antennas a. In certain embodiments, windows and/or associated structures (e.g., controllers, IGU spacers, and frames) have antennas attached or fabricated thereon. Examples of such window antennas are described in PCT Patent Application No. PCT/US2015/062387, filed Nov. 24, 2015, and incorporated herein by reference in its entirety.

a. A window antenna can provide the location of occupants and/or visitors, who carry communication enabled devices such as mobile phones b. presence of intruders and other security related information (e.g., when a window has a privacy setting activated).

c. bandwidth consumed or available on services provided by the window antennas

In certain embodiments, the windows, controllers, and/or sensors have their performance or response checked at an initial point in time and thereafter rechecked repeatedly. In some cases, recent performance/response measurements are compared with earlier performance/response measurements to detect trends, deviations, stability, etc. If necessary, adjustments can be made or service can be provided to address trends or deviations detected during comparisons. The collection of relevant parameters for a window, sensor, or controller may serve as a "fingerprint" for the device. Such parameters include voltage response, current response, communications fidelity, etc. as described elsewhere herein. In some embodiments, windows, sensors, and/or controllers are checked and optionally fingerprinted at the factory. For example, a switchable window may go through a burn in procedures during which relevant parameters can be extracted. Windows exhibiting problems can have their current performance compared against earlier fingerprints to optionally determine whether the problem developed after shipping/installation or during operation. Fingerprints can also be generated, optionally automatically, when the devices are commissioned (e.g., installed at a site and initially detected and cataloged). Commissioning is described in PCT Patent Application No. PCT/US2013/036456, filed Apr. 12, 2013, and incorporated herein by reference in its entirety.

Building Management Systems (BMSs) and Smart Appliance Systems

A BMS is a computer-based control system installed at a site (e.g., a building) that can monitor and control the site's mechanical and electrical equipment such as ventilation, lighting, power systems, elevators, fire systems, and security systems. In certain embodiments, a BMS may be designed or configured to communicate with a window system to receive control signals and communicate monitored information from systems at the site. A BMS consists of hardware, including interconnections by communication channels to a computer or computers, and associated software for maintaining conditions in the site according to preferences set by the occupants, site manager, and/or window system manager. For example, a BMS may be implemented using a local area network, such as Ethernet. The software can be based on, for example, internet protocols and/or open standards. One example of software is software from Tridium, Inc. (of Richmond, Va.). One communications protocol commonly used with a BMS is BACnet (building automation and control networks).

A BMS is most common in a large building, and typically functions at least to control the environment within the building. For example, a BMS may control temperature, carbon dioxide levels, and humidity within a building. Typically, there are many mechanical devices that are controlled by a BMS such as heaters, air conditioners, blowers, vents, and the like. To control the building environment, a BMS may turn on and off these various devices under defined conditions. A core function of a typical modern BMS is to maintain a comfortable environment for the building's occupants while minimizing heating and cooling costs/demand. Thus, a modern BMS is used not only to monitor and control, but also to optimize the synergy between various systems, for example, to conserve energy and lower building operation costs.

In some embodiments, a window control system interfaces with a BMS, where the window control system is configured to control one or more electrochromic windows or other tintable windows. In one embodiment, each of the one or more tintable windows includes at least one all solid state and inorganic electrochromic device. In another embodiment, each of the one or more tintable windows includes only all solid state and inorganic electrochromic devices. In another embodiment, one or more of the tintable windows are multistate electrochromic windows, as described in U.S. patent application Ser. No. 12/851,514, filed on Aug. 5, 2010, and entitled "Multipane Electrochromic Windows."

FIG. 1C is a schematic diagram of an embodiment of a site network 1100 having a BMS that manages a number of systems of a building, including security systems, heating/ventilation/air conditioning (HVAC), lighting of the building, power systems, elevators, fire systems, and the like. Security systems may include magnetic card access, turnstiles, solenoid driven door locks, surveillance cameras, burglar alarms, metal detectors, and the like. Fire systems may include fire alarms and fire suppression systems including a water plumbing control. Lighting systems may include interior lighting, exterior lighting, emergency warning lights, emergency exit signs, and emergency floor egress lighting. Power systems may include the main power, backup power generators, and uninterrupted power source (UPS) grids.

Also, the BMS interfaces with a window network 1102. In this example, window network 1102 is depicted as a distributed network of window controllers including a master network controller, 1103, intermediate network controllers, 1105*a* and 1105*b*, and end or leaf controllers 1110. End or leaf controllers 1110 may be similar to window controller 450 described with respect to FIGS. 4 and 5. For example, master network controller 1103 may be responsible for interfacing with the BMS, e.g., via an API, and each floor of building 1101 may have one or more intermediate network controllers 1105*a* and 1105*b*, while each window of the building has its own end or leaf controller 1110. In this example, each of controllers 1110 controls a specific tintable window of building 1101. In certain embodiments, window network 1102 and/or master network controller 1103 communicates with a window intelligence system or component thereof such as a data warehouse.

Each of controllers 1110 can be in a separate location from the tintable window that it controls, or can be integrated into the tintable window. For simplicity, only a few tintable windows of building 1101 are depicted as controlled by master window controller 1102. In a typical setting there may be a large number of tintable windows in a building controlled by window network 1102, which may be a distributed network of window controllers. In alternative embodiments, a single end controller which controls the functions of a single tintable window also falls within the scope of the embodiments disclosed herein.

By incorporating feedback from a window controller, a BMS can provide, for example, enhanced: 1) environmental control, 2) energy savings, 3) security, 4) flexibility in control options, 5) improved reliability and usable life of other systems due to less reliance thereon and therefore less maintenance thereof, 6) information availability and diagnostics, 7) effective use of staff, and various combinations of these, because the tintable windows can be automatically controlled.

In some embodiments, a BMS may not be present or a BMS may be present but may not directly communicate with a master network controller or communicate at a high level with a master network controller. In these embodiments, a master network controller can provide, for example, enhanced: 1) environmental control, 2) energy savings, 3) flexibility in control options, 4) improved reliability and usable life of other systems due to less reliance thereon and therefore less maintenance thereof, 5) information availability and diagnostics, 6) effective use of staff, and various combinations of these, because the tintable windows can be automatically controlled. In these embodiments, maintenance on the BMS does not interrupt control of the tintable windows.

In certain embodiments, a BMS may be in communication with the window system, via an API, to receive control signals and transmit monitored data from one or more systems controlled by the BMS.

FIG. 1D is a block diagram of an alternative embodiment employing a network 1200 for a site (e.g., building). The network 1200 may employ any number of different communication protocols, including BACnet. As shown, site network 1200 includes a window system 1205, a lighting control panel 1210, a BMS 1215, a security control system, 1220, a user console, 1225, a smart thermostat service or other home appliance service (e.g., NEST) 1227. These different controllers and systems at the site may be used to receive input from and/or control a HVAC system 1230, lights 1235, security sensors 1240, door locks 1245, cameras 1250, tintable windows 1255, and thermostats 1257 of the site.

A lighting control panel may include circuits or other logic to control the interior lighting, the exterior lighting, the emergency warning lights, the emergency exit signs, and the emergency floor egress lighting. A lighting control panel (e.g., panel 1210) also may access occupancy sensors in the rooms of the site. BMS 1215 may include a server that receives data from and issues commands to the other systems and controllers of site network 1200. For example, BMS 1215 may receive data from and issue commands to each of the window controller 1205, lighting control panel 1210, and security control system 1220. Security control system 1220 may include magnetic card access, turnstiles, solenoid driven door locks, surveillance cameras, burglar alarms, metal detectors, and the like. User console 1225 may be a computer terminal that can be used by the site manager to schedule operations of, control, monitor, optimize, and troubleshoot the different systems of the site. Software from Tridium, Inc. may generate visual representations of data from different systems for user console 1225.

Each of the different controls may control individual devices/apparatus. Window system 1205 controls windows 1255. Lighting control panel 1210 controls lights 1235. BMS 1215 may control HVAC 1230. Security control system 1220 controls security sensors 1240, door locks 1245, and cameras 1250. Data may be exchanged and/or shared between all of the different devices/apparatus and controllers that are part of site network 1200.

In some cases, the systems of site network 1100 or site network 1200 may run according to daily, monthly, quarterly, or yearly schedules. For example, the lighting control system, the window control system, the HVAC, and the security system may operate on a 24 hour schedule accounting for when people are at the site during the work day. At night, the site may enter an energy savings mode, and during the day, the systems may operate in a manner that minimizes the energy consumption of the site while providing for occupant comfort. As another example, the systems may shut down or enter an energy savings mode over a holiday period.

The scheduling information may be combined with geographical information. Geographical information may include the latitude and longitude of a site such as, for example, a building. In the case of a building, geographical information also may include information about the direction that each side of the building faces. Using such information, different rooms on different sides of the building may be controlled in different manners. For example, for east facing rooms of the building in the winter, the window controller may instruct the windows to have no tint in the morning so that the room warms up due to sunlight shining in the room and the lighting control panel may instruct the lights to be dim because of the lighting from the sunlight. The west facing windows may be controllable by the occupants of the room in the morning because the tint of the windows on the west side may have no impact on energy savings. However, the modes of operation of the east facing windows and the west facing windows may switch in the evening (e.g., when the sun is setting, the west facing windows are not tinted to allow sunlight in for both heat and lighting).

Described below is an example of a site such as, for example, the building 1101 in FIG. 1C, that includes a site network, tintable windows for the exterior windows (e.g., windows separating the interior of the building from the exterior of the building), and a number of different sensors. Light from exterior windows of a building generally has an effect on the interior lighting in the building about 20 feet or about 30 feet from the windows. That is, space in a building that is more that about 20 feet or about 30 feet from an exterior window receives little light from the exterior window. Such spaces away from exterior windows in a building are lit by lighting systems of the building.

Further, the temperature within a building may be influenced by exterior light and/or the exterior temperature. For example, on a cold day and with the building being heated by a heating system, rooms closer to doors and/or windows will lose heat faster than the interior regions of the building and be cooler compared to the interior regions.

For exterior condition monitoring, the building may include exterior sensors on the roof of the building. Alternatively, the building may include an exterior sensor associated with each exterior window or an exterior sensor on each side of the building. An exterior sensor on each side of the building could track the irradiance on a side of the building as the sun changes position throughout the day.

When a window controller is integrated into a site network, outputs from exterior sensors may be input to a site network and/or window system. In some cases, these outputs may be provided as input to a local window controller. For example, in some embodiments, output signals from any two or more exterior sensors are received. In some embodiments, only one output signal is received, and in some other embodiments, three, four, five, or more outputs are received. These output signals may be received over a site network.

In some embodiments, the output signals received by sensor(s) include a signal indicating energy or power consumption by a heating system, a cooling system, and/or lighting within the building. For example, the energy or power consumption of the heating system, the cooling system, and/or the lighting of the building may be monitored to provide the signal indicating energy or power consumption. Devices may be interfaced with or attached to the circuits and/or wiring of the building to enable this monitoring. Alternatively, the power systems in the building may be installed such that the power consumed by the heating system, a cooling system, and/or lighting for an individual room within the building or a group of rooms within the building can be monitored.

Tint instructions can be provided to change to tint of the tintable window to a determined level of tint. For example, referring to FIG. 1C, this may include master network controller 1103 issuing commands to one or more intermediate network controllers 1105a and 1105b, which in turn issue commands to end controllers 1110 that control each window of the building. Master network controller 1103 may issue commands based on commands received from a BMS and/or a window system. End controllers 1100 may apply voltage and/or current to the window to drive the change in tint pursuant to the instructions.

In some embodiments, a site including tintable windows may be enrolled in or participate in a demand response program run by the utility or utilities providing power to the site. The program may be a program in which the energy consumption of the site is reduced when a peak load occurrence is expected. The utility may send out a warning signal prior to an expected peak load occurrence. For example, the warning may be sent on the day before, the morning of, or about one hour before the expected peak load occurrence. A peak load occurrence may be expected to occur on a hot summer day when cooling systems/air conditioners are drawing a large amount of power from the utility, for example. The warning signal may be received by a BMS of a building, by the window system, or by window controllers configured to control the tintable windows in the building. This warning signal can be an override mechanism that disengages the tinting control. The BMS or window system can then instruct the window controller(s) to transition the appropriate electrochromic device in the tintable windows to a dark tint level aid in reducing the power draw of the cooling systems in the building at the time when the peak load is expected.

In some embodiments, tintable windows (e.g., electrochromic windows) of windows of a site may be grouped into zones with tintable windows in a zone being instructed in a similar manner. For example, the exterior windows of the site (i.e., windows separating the interior from the exterior of a building), may be grouped into zones, with tintable windows in a zone being instructed in a similar manner. For example, groups of tintable windows on different floors of the building or different sides of a building may be in different zones. In one case, on the first floor of the building, all of the east facing tintable windows may be in zone 1, all of the south facing tintable windows may be in zone 2, all of the west facing tintable windows may be in zone 3, and all of the north facing tintable windows may be in zone 4. In another case, all of the tintable windows on the first floor of the building may be in zone 1, all of the tintable windows on the second floor may be in zone 2, and all of the tintable windows on the third floor may be in zone 3. In yet another case, all of the east facing tintable windows may be in zone 1, all of the south facing tintable windows may be in zone 2, all of the west facing tintable windows may be in zone 3, and all of the north facing tintable windows may be in zone 4. As yet another case, east facing tintable windows on one floor could be divided into different zones. Any number of tintable windows on the same side and/or different sides and/or different floors of the building may be assigned to a zone.

In some embodiments, tintable windows in a zone may be controlled by the same window controller. In some other embodiments, tintable windows in a zone may be controlled by different window controllers, but the window controllers may all receive the same output signals from sensors and use the same function or lookup table to determine the level of tint for the windows in a zone.

In some embodiments, tintable windows in a zone may be controlled by a window controller or controllers that receive an output signal from a transmissivity sensor. In some embodiments, the transmissivity sensor may be mounted proximate the windows in a zone. For example, the transmissivity sensor may be mounted in or on a frame containing an IGU (e.g., mounted in or on a mullion, the horizontal sash of a frame) included in the zone. In some other embodiments, tintable windows in a zone that includes the windows on a single side of the building may be controlled by a window controller or controllers that receive an output signal from a transmissivity sensor.

In some embodiments, a sensor (e.g., photosensor) may provide an output signal to a window controller to control the tintable windows of a first zone (e.g., a master control zone). The window controller may also control the tintable windows in a second zone (e.g., a slave control zone) in the same manner as the first zone. In some other embodiments, another window controller may control the tintable windows in the second zone in the same manner as the first zone.

In some embodiments, a site manager, occupants of rooms in the second zone, or other person may manually instruct (using a tint or clear command or a command from a user console of a BMS, for example) the tintable windows in the second zone (i.e., the slave control zone) to enter a tint level such as a colored state (level) or a clear state. In some embodiments, when the tint level of the windows in the second zone is overridden with such a manual command, the tintable windows in the first zone (i.e., the master control zone) remain under control of the window controller receiving output from the transmissivity sensor. The second zone may remain in a manual command mode for a period of time and then revert back to be under control of the window controller receiving output from the transmissivity sensor. For example, the second zone may stay in a manual mode for one hour after receiving an override command, and then may revert back to be under control of the window controller receiving output from the transmissivity sensor.

In some embodiments, a site manager, occupants of rooms in the first zone, or other person may manually instruct (using a tint command or a command from a user console of a BMS, for example) the windows in the first zone (i.e., the master control zone) to enter a tint level such as a colored state or a clear state. In some embodiments, when the tint level of the windows in the first zone is overridden with such a manual command, the tintable windows in the second zone (i.e., the slave control zone) remain under control of the window controller receiving outputs from the exterior sensor. The first zone may remain in a manual command mode for a period of time and then revert back to be under control of window controller receiving output from the transmissivity sensor. For example, the first zone may stay in a manual mode for one hour after receiving an override command, and then may revert back to be under control of the window controller receiving output from the transmissivity sensor. In some other embodiments, the tintable windows in the second zone may remain in the tint level that they are in when the manual override for the first zone is received. The first zone may remain in a manual command mode for a period of time and then both the first zone and the second zone may revert back to be under control of the window controller receiving output from the transmissivity sensor.

Any of the methods described herein of control of a tintable window, regardless of whether the window controller is a standalone window controller or is interfaced with a site network, may be used control the tint of a tintable window.

The references to a BMS in the above description can be replaced in some or all instances with references to a smart thermostat service or other home appliance service such as NEST. The communication between the window system and the BMS or home appliance service can be via an API as described above.

Some features of this disclosure may be implemented on a mesh network, such as the networks described in U.S. Provisional Patent Application No. 62/085,179, filed Nov. 26, 2014, previously incorporated by reference in its entirety. Devices on a mesh network can make use of information known by the network. For instance, where GPS coordinates of one or more windows are known, the other non-window devices can learn their exact locations based on the GPS data and the relative positions of all the other (window and non-window) devices. Because GPS typically does not work inside a building, direct GPS sensing of device positions inside of a building is difficult or impossible. As such, by using the absolute position information learned from the windows themselves, and the relative positions of the various devices on the network, even non-window devices that are inside of a building can learn of their exact locations. In some implementations, such network devices may be populated into the map that is auto-generated. For example, where an office building uses electrochromic windows and printers that are each capable of connecting to the mesh network, the map generated by the controller(s) may show the relative locations of all the windows and printers connected to the network. A building occupant can use this map (e.g., loaded into a smartphone application, computer, etc.) to help them find their nearest printer or other relevant device on the mesh network. Occupancy sensors and HVAC components may also be connected to or interface with the mesh network. In such cases, the map generated by the controller(s) may show whether particular rooms are occupied based on information from the occupancy sensors, and may show other conditions (e.g., actual temperature, thermostat setting, humidity, status of lights, etc.) based on information from other HVAC components. The accuracy and precision of the map are increased with an increased number of devices on the mesh network, since the additional devices provide further data for the system to piece together.

Windows on the mesh network may be configured to interact with other devices on the mesh network, for example they interact via an API or directly with thermostats or other HVAC components. For instance, where a window or set of windows tint (thereby reducing the rate that heat enters the building through the window(s)), the window(s) may send a signal to a thermostat or other HVAC component to reduce the degree of cooling occurring through air conditioning. Similar signals may be sent to increase the degree of cooling through air conditioning, or to control a heating system. Additionally, information gleaned by the electrochromic window (e.g., through sensors, performance, etc.) may be shared with a thermostat or other HVAC component to help inform decisions made by the thermostat or HVAC.

In some embodiments, the controllers may have instructions to control the windows based on the sensed relative and exact positions/orientations of the various windows. For example, the controllers may have instructions to color east-facing windows early in the morning to prevent the sun from heating up the east-facing rooms, and to bleach the east-facing windows later in the afternoon when the sun is not shining directly into the east-facing rooms. Any control scheme may be used, and may be programmed into a controller by a user or installer, or may be pre-programmed by a manufacturer, vendor, etc. In some embodiments the window controllers are programmable in a similar manner as a thermostat (with the option of controlling a single window or multiple windows together).

Wireless or Wired Communication

In some embodiments, window controllers described herein include components for wired or wireless communication between the window controller, sensors, and separate communication nodes. Wireless or wired communications may be accomplished with a communication interface that interfaces directly with the window controller. Such interface could be native to the microprocessor or provided via additional circuitry enabling these functions. In addition, other systems of a site network may include components for wired or wireless communication between different system elements.

A separate communication node for wireless communications can be, for example, another wireless window controller, an end, intermediate, or master window controller, a remote control device, a BMS, or a window system. Wireless communication is used in the window controller for at least one of the following operations: programming and/or operating the tintable window 505 (FIG. 5), collecting data from the tintable window 505 from the various sensors and protocols described herein, and using the tintable window 505 as a relay point for wireless communication. Data collected from tintable windows 505 also may include count data such as number of times an EC device has been activated, efficiency of the EC device over time, and the like. These wireless communication features is described in more detail below.

In one embodiment, wireless communication is used to operate the associated tintable windows 505, for example, via an infrared (IR), and/or radio frequency (RF) signal. In certain embodiments, the controller will include a wireless protocol chip, such as Bluetooth, EnOcean, Wi-Fi, ZigBee, and the like. Window controllers may also have wireless communication via a network. Input to the window controller can be manually input by an end user at a wall switch, either directly or via wireless communication, or the input can be from a BMS of a site of which the tintable window is a component or from a window system managing system.

In one embodiment, when the window controller is part of a distributed network of controllers, wireless communication is used to transfer data to and from each of a plurality of tintable windows via the distributed network of controllers, each having wireless communication components. For example, referring again to FIG. 1C, master network controller 1103, communicates wirelessly with each of intermediate network controllers 1105a and 1105b, which in turn communicate wirelessly with end controllers 1110, each associated with an tintable window. Master network controller 1103 may also communicate wirelessly with a BMS or with a window system. In one embodiment, at least one level of communication in the window controller is performed wirelessly.

In some embodiments, more than one mode of wireless communication is used in the window controller distributed network. For example, a master window controller may communicate wirelessly to intermediate controllers via Wi-Fi or ZigBee, while the intermediate controllers communicate with end controllers via Bluetooth, ZigBee, EnOcean, or other protocol. In another example, window controllers have redundant wireless communication systems for flexibility in end user choices for wireless communication.

Example of System for Controlling Functions of Tintable Windows

FIG. 1E is a block diagram of components of a window network system 1400 for controlling functions (e.g., transitioning to different tint levels) of one or more tintable windows at a site (e.g., building 1101 shown in FIG. 1C), according to embodiments. System 1400 may be one of the systems managed by a window system through a BMS (e.g., BMS 1100 shown in FIG. 1C) or may be managed directly by a window system and/or operate independently of a BMS.

System 1400 includes a master window controller 1402 that can send control signals to the tintable windows to control its functions. System 1400 also includes a network 1410 in electronic communication with master window controller 1402. Control logic and instructions for controlling functions of the tintable window(s), and/or sensor data may be communicated to the master window controller 1402 through the network 1410. Network 1410 can be a wired or a wireless network (e.g. a cloud network). In some embodiments, network 1410 may be in communication with a BMS (e.g., over an API) to allow the BMS to send instructions for controlling the tintable window(s) through network 1410 to the tintable window(s) in a building. In some cases, the BMS may be in communication with the window system to receive instructions for controlling the tintable window(s) from the window system. In other embodiments, network 1410 may be in communication with a window system to allow the window system to send instructions for controlling the tintable window(s) through network 1410 to the tintable window(s) in a building. In certain embodiments, the master window controller 1402 and/or the master network controller 1403 are designed or configured to communicate with the window system or component thereof such as a data warehouse.

System 1400 also includes EC devices 400 of the tintable windows (not shown) and wall switches 1490, which are both in electronic communication with master window controller 1402. In this illustrated example, master window controller 1402 can send control signals to EC device(s) to control the tint level of the tintable windows having the EC device(s). Each wall switch 1490 is also in communication with EC device(s) and master window controller 1402. An end user (e.g., occupant of a room having the tintable window) can use the wall switch 1490 to control the tint level and other functions of the tintable window having the EC device(s).

In FIG. 1E, master window controller 1402 is depicted as a distributed network of window controllers including a master network controller 1403, a plurality of intermediate network controllers 1405 in communication with the master network controller 1403, and multiple pluralities of end or leaf window controllers 1110. Each plurality of end or leaf window controllers 1110 is in communication with a single intermediate network controller 1405. Although master window controller 1402 is illustrated as a distributed network of window controllers, master window controller 1402 could also be a single window controller controlling the functions of a single tintable window in other embodiments. The components of the system 1400 in FIG. 1D may be similar in some respects to components described with respect to FIG. 1B. For example, master network controller 1403 may be similar to master network controller 1103 and intermediate network controllers 1405 may be similar to intermediate network controllers 1105. Each of the window controllers in the distributed network of FIG. 1E may include a processor (e.g., microprocessor) and a computer readable medium in electrical communication with the processor.

In FIG. 1E, each leaf or end window controller 1110 is in communication with EC device(s) 400 of a single tintable window to control the tint level of that tintable window in the building. In the case of an IGU, the leaf or end window controller 1110 may be in communication with EC devices 400 on multiple lites of the IGU control the tint level of the IGU. In other embodiments, each leaf or end window controller 1110 may be in communication with a plurality of tintable windows. The leaf or end window controller 1110 may be integrated into the tintable window or may be separate from the tintable window that it controls. Leaf and end window controllers 1110 in FIG. 1E may be similar to the end or leaf controllers 1110 in FIG. 1C and/or may also be similar to window controller 450 described with respect to FIG. 5.

Each wall switch 1490 can be operated by an end user (e.g., occupant of the room) to control the tint level and other functions of the tintable window in communication with the wall switch 1490. The end user can operate the wall switch 1490 to communicate control signals to the EC devices 400 in the associated tintable window. These signals from the wall switch 1490 may override signals from master window controller 1402 in some cases. In other cases (e.g., high demand cases), control signals from the master window controller 1402 may override the control signals from wall switch 1490. Each wall switch 1490 is also in communication with the leaf or end window controller 1110 to send information about the control signals (e.g. time, date, tint level requested, etc.) sent from wall switch 1490 back to master window controller 1402. In some cases, wall switches 1490 may be manually operated. In other cases, wall switches 1490 may be wirelessly controlled by the end user using a remote device (e.g., cell phone, tablet, etc.) sending wireless communications with the control signals, for example, using infrared (IR), and/or radio frequency (RF) signals. In some cases, wall switches 1490 may include a wireless protocol chip, such as Bluetooth, EnOcean, Wi-Fi, ZigBee, and the like. Although wall switches 1490 depicted in FIG. 1E are located on the wall(s), other embodiments of system 1400 may have switches located elsewhere in the room.

Wireless communication between, for example, master and/or intermediate window controllers and end window controllers offers the advantage of obviating the installation of hard communication lines. This is also true for wireless communication between window controllers and BMS. In one aspect, wireless communication in these roles is useful for data transfer to and from electrochromic windows for operating the window and providing data to, for example, a BMS for optimizing the environment and energy savings in a building. Window location data as well as feedback from sensors are synergized for such optimization. For example, granular level (window-by-window) microclimate information is fed to a BMS in order to optimize the building's various environments.

The references to a BMS in the above description can be replaced in some or all instances with references to a smart thermostat service or other home appliance service such as NEST. The communication between the window system and the BMS or home appliance service can be via an API as described above.

Example Switching Algorithm

Figure 2:
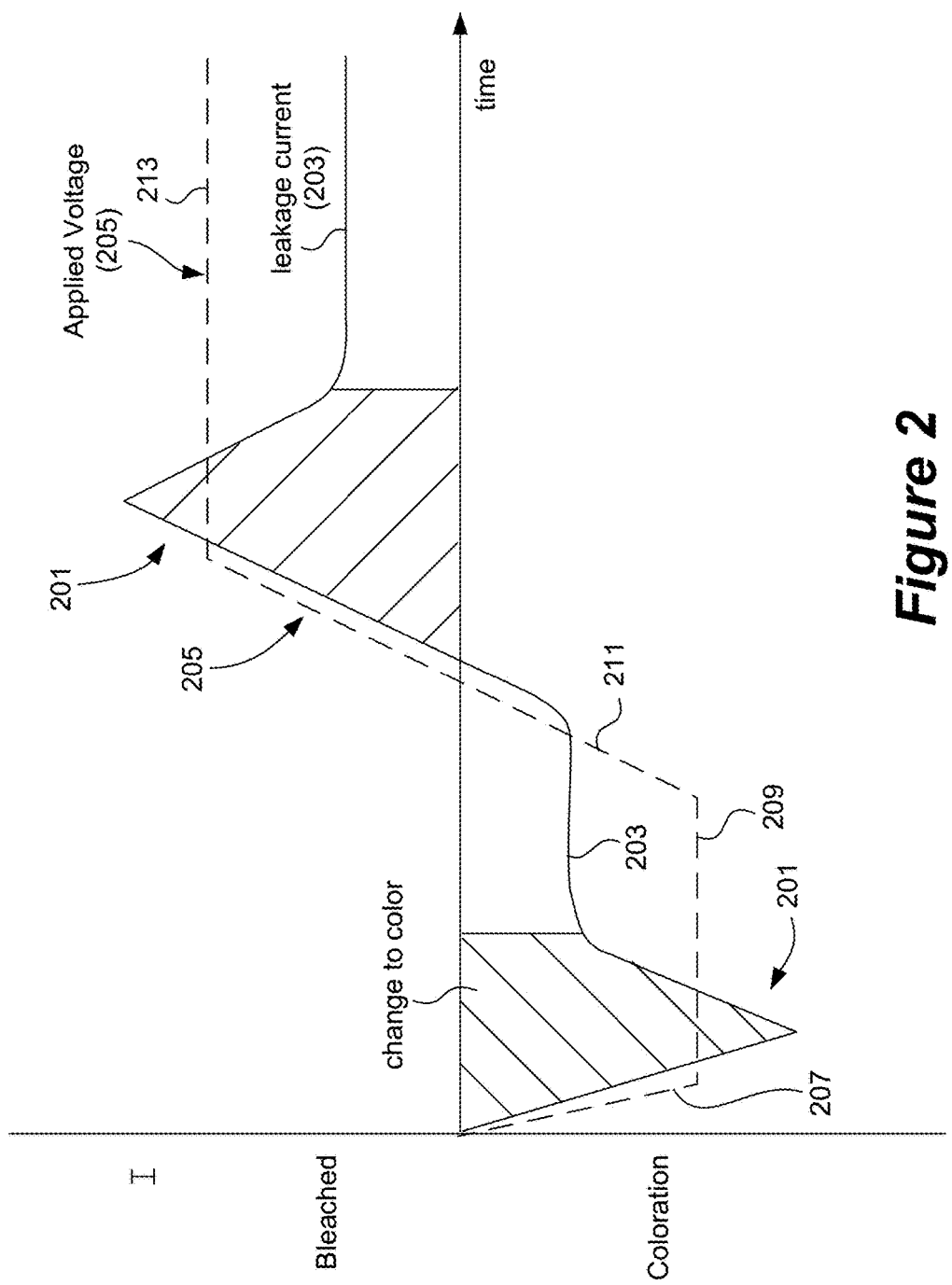
FIG. 2 is a graph depicting voltage and current profiles associated with driving an electrochromic device from bleached to colored and from colored to bleached.

To speed along optical transitions, the applied voltage is initially provided at a magnitude greater than that required to hold the device at a particular optical state in equilibrium. This approach is illustrated in FIGS. 2 and 3. FIG. 2 is a graph depicting voltage and current profiles associated with driving an electrochromic device from bleached to colored and from colored to bleached. FIG. 3 is a graph depicting certain voltage and current profiles associated with driving an electrochromic device from bleached to colored.

FIG. 2 shows a complete current profile and voltage profile for an electrochromic device employing a simple voltage control algorithm to cause an optical state transition cycle (coloration followed by bleaching) of an electrochromic device. In the graph, total current density (I) is represented as a function of time. As mentioned, the total current density is a combination of the ionic current density associated with an electrochromic transition and electronic leakage current between the electrochemically active electrodes. Many different types electrochromic device will have the depicted current profile. In one example, a cathodic electrochromic material such as tungsten oxide is used in conjunction with an anodic electrochromic material such as nickel tungsten oxide in counter electrode. In such devices, negative currents indicate coloration of the device. In one example, lithium ions flow from a nickel tungsten oxide anodically coloring electrochromic electrode into a tungsten oxide cathodically coloring electrochromic electrode. Correspondingly, electrons flow into the tungsten oxide electrode to compensate for the positively charged incoming lithium ions. Therefore, the voltage and current are shown to have a negative value.

The depicted profile results from ramping up the voltage to a set level and then holding the voltage to maintain the optical state. The current peaks 201 are associated with changes in optical state, i.e., coloration and bleaching. Specifically, the current peaks represent delivery of the ionic charge needed to color or bleach the device. Mathematically, the shaded area under the peak represents the total charge required to color or bleach the device. The portions of the curve after the initial current spikes (portions 203) represent electronic leakage current while the device is in the new optical state.

In the figure, a voltage profile 205 is superimposed on the current curve. The voltage profile follows the sequence: negative ramp (207), negative hold (209), positive ramp (211), and positive hold (213). Note that the voltage remains constant after reaching its maximum magnitude and during the length of time that the device remains in its defined optical state. Voltage ramp 207 drives the device to its new the colored state and voltage hold 209 maintains the device in the colored state until voltage ramp 211 in the opposite direction drives the transition from colored to bleached states. In some switching algorithms, a current cap is imposed. That is, the current is not permitted to exceed a defined level in order to prevent damaging the device (e.g. driving ion movement through the material layers too quickly can physically damage the material layers). The coloration speed is a function of not only the applied voltage, but also the temperature and the voltage ramping rate.

FIG. 3 illustrates a voltage control profile in accordance with certain embodiments. In the depicted embodiment, a voltage control profile is employed to drive the transition from a bleached state to a colored state (or to an intermediate state). To drive an electrochromic device in the reverse direction, from a colored state to a bleached state (or from a more colored to less colored state), a similar but inverted profile is used. In some embodiments, the voltage control profile for going from colored to bleached is a mirror image of the one depicted in FIG. 3.

The voltage values depicted in FIG. 3 represent the applied voltage (Vapp) values. The applied voltage profile is shown by the dashed line. For contrast, the current density in the device is shown by the solid line. In the depicted profile, $V_{app}$ includes four components: a ramp to drive component 303, which initiates the transition, a $V_{drive}$ component 313, which continues to drive the transition, a ramp to hold component 315, and a $V_{hold}$ component 317. The ramp components are implemented as variations in $V_{app}$ and the $V_{drive}$ and $V_{hold}$ components provide constant or substantially constant Vapp magnitudes.

The ramp to drive component is characterized by a ramp rate (increasing magnitude) and a magnitude of $V_{drive}$. When the magnitude of the applied voltage reaches $V_{drive}$, the ramp to drive component is completed. The $V_{drive}$ component is characterized by the value of $V_{drive}$ as well as the duration of $V_{drive}$. The magnitude of $V_{drive}$ may be chosen to maintain $V_{eff}$ with a safe but effective range over the entire face of the electrochromic device as described above.

The ramp to hold component is characterized by a voltage ramp rate (decreasing magnitude) and the value of $V_{hold}$ (or optionally the difference between $V_{drive}$ and $V_{hold}$). $V_{app}$ drops according to the ramp rate until the value of $V_{hold}$ is reached. The $V_{hold}$ component is characterized by the magnitude of $V_{hold}$ and the duration of $V_{hold}$. Actually, the duration of Vhold is typically governed by the length of time that the device is held in the colored state (or conversely in the bleached state). Unlike the ramp to drive, $V_{drive}$, and ramp to hold components, the $V_{hold}$ component has an arbitrary length, which is independent of the physics of the optical transition of the device.

Each type of electrochromic device will have its own characteristic components of the voltage profile for driving the optical transition. For example, a relatively large device and/or one with a more resistive conductive layer will require a higher value of Vdrive and possibly a higher ramp rate in the ramp to drive component. Larger devices may also require higher values of $V_{hold}$. U.S. patent application Ser. No. 13/449,251, filed Apr. 17, 2012, and incorporated herein by reference, discloses controllers and associated algorithms for driving optical transitions over a wide range of conditions. As explained therein, each of the components of an applied voltage profile (ramp to drive, $V_{drive}$, ramp to hold, and $V_{hold}$, herein) may be independently controlled to address real-time conditions such as current temperature, current level of transmissivity, etc. In some embodiments, the values of each component of the applied voltage profile is set for a particular electrochromic device (having its own bus bar separation, resistivity, etc.) and does vary based on current conditions. In other words, in such embodiments, the voltage profile does not take into account feedback such as temperature, current density, and the like.

As indicated, all voltage values shown in the voltage transition profile of FIG. 3 correspond to the Vapp values described above. They do not correspond to the Veff values described above. In other words, the voltage values depicted in FIG. 3 are representative of the voltage difference between the bus bars of opposite polarity on the electrochromic device.

In certain embodiments, the ramp to drive component of the voltage profile is chosen to safely but rapidly induce ionic current to flow between the electrochromic and counter electrodes. As shown in FIG. 3, the current in the device follows the profile of the ramp to drive voltage component until the ramp to drive portion of the profile ends and the $V_{drive}$ portion begins. See current component 301 in FIG. 3. Safe levels of current and voltage can be determined empirically or based on other feedback. U.S. Pat. No. 8,254,013, filed Mar. 16, 2011, issued Aug. 28, 2012 and incorporated herein by reference, presents examples of algorithms for maintaining safe current levels during electrochromic device transitions.

In certain embodiments, the value of $V_{drive}$ is chosen based on the considerations described above. Particularly, it is chosen so that the value of $V_{eff}$ over the entire surface of the electrochromic device remains within a range that effectively and safely transitions large electrochromic devices. The duration of $V_{drive}$ can be chosen based on various considerations. One of these ensures that the drive potential is held for a period sufficient to cause the substantial coloration of the device. For this purpose, the duration of $V_{drive}$ may be determined empirically, by monitoring the optical density of the device as a function of the length of time that Vdrive remains in place. In some embodiments, the duration of $V_{drive}$ is set to a specified time period. In another embodiment, the duration of $V_{drive}$ is set to correspond to a desired amount of ionic charge being passed. As shown, the current ramps down during $V_{drive}$. See current segment 307.

Another consideration is the reduction in current density in the device as the ionic current decays as a consequence of the available lithium ions completing their journey from the anodic coloring electrode to the cathodic coloring electrode (or counter electrode) during the optical transition. When the transition is complete, the only current flowing across device is leakage current through the ion conducting layer. As a consequence, the ohmic drop in potential across the face of the device decreases and the local values of $V_{eff}$ increase. These increased values of $V_{eff}$ can damage or degrade the device if the applied voltage is not reduced. Thus, another consideration in determining the duration of $V_{drive}$ is the goal of reducing the level of $V_{eff}$ associated with leakage current. By dropping the applied voltage from Vdrive to Vhold, not only is $V_{eff}$ reduced on the face of the device but leakage current decreases as well. As shown in FIG. 3, the device current transitions in a segment 305 during the ramp to hold component. The current settles to a stable leakage current 309 during $V_{hold}$.

Figure 4:
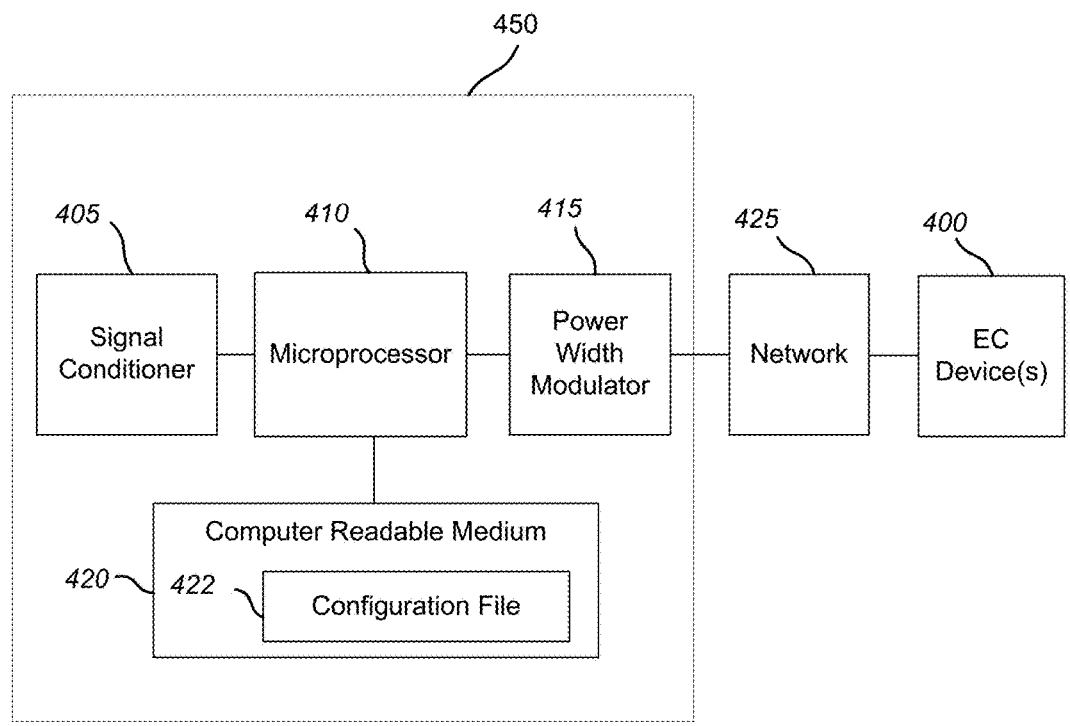
FIG. 4 depicts a simplified block diagram of components of a window controller.

FIG. 4 depicts a block diagram of some components of a window controller 450 and other components of a window controller system of disclosed embodiments. FIG. 4 is a simplified block diagram of a window controller, and more detail regarding window controllers can be found in U.S. patent application Ser. Nos. 13/449,248 and 13/449,251, both naming Stephen Brown as inventor, both titled "CONTROLLER FOR OPTICALLY-SWITCHABLE WINDOWS," and both filed on Apr. 17, 2012, and in U.S. patent Ser. No. 13/449,235, titled "CONTROLLING TRANSITIONS IN OPTICALLY SWITCHABLE DEVICES," naming Stephen Brown et al. as inventors and filed on Apr. 17, 2012, all of which are hereby incorporated by reference in their entireties.

In FIG. 4, the illustrated components of the window controller 450 include a window controller 450 having a microprocessor 410 or other processor, a power width modulator (PWM) 415, a signal conditioning module 405, and a computer readable medium 420 (e.g., memory) having a configuration file 422. Window controller 450 is in electronic communication with one or more electrochromic devices 400 in an electrochromic window through network 425 (wired or wireless) to send instructions to the one or more electrochromic devices 400. In some embodiments, the window controller 450 may be a local window controller in communication through a network (wired or wireless) to a master window controller.

In disclosed embodiments, a site may be a building having at least one room having an electrochromic window between the exterior and interior of a building. One or more sensors may be located to the exterior of the building and/or inside the room. In embodiments, the output from the one or more sensors may be input to the signal conditioning module 405 of the window controller 450. In some cases, the output from the one or more sensors may be input to a BMS or to a window system. Although the sensors of depicted embodiments are shown as located on the outside vertical wall of the building, this is for the sake of simplicity, and the sensors may be in other locations, such as inside the room or on other surfaces to the exterior, as well. In some cases, two or more sensors may be used to measure the same input, which can provide redundancy in case one sensor fails or has an otherwise erroneous reading.

Room Sensors and Window Controller

Figure 5:
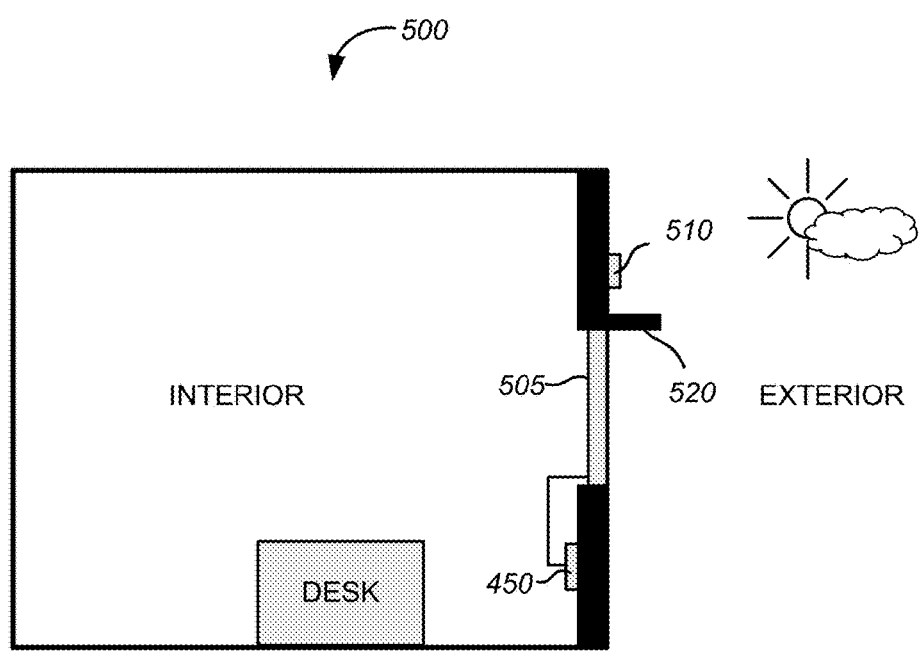
FIG. 5 depicts a schematic diagram of a room including a tintable window and at least one sensor.

FIG. 5 depicts a schematic diagram of a room 500 having a tintable window 505 with at least one electrochromic device. The tintable window 505 is located between the exterior and the interior of a building, which includes the room 500. The room 500 also includes a window controller 450 connected to and configured to control the tint level of the tintable window 505. An exterior sensor 510 is located on a vertical surface in the exterior of the building. In other embodiments, an interior sensor may also be used to measure the ambient light in room 500. In yet other embodiments, an occupant sensor may also be used to determine when an occupant is in the room 500.

Exterior sensor 510 is a device, such as a photosensor, that is able to detect radiant light incident upon the device flowing from a light source such as the sun or from light reflected to the sensor from a surface, particles in the atmosphere, clouds, etc. The exterior sensor 510 may generate a signal in the form of electrical current that results from the photoelectric effect and the signal may be a function of the light incident on the sensor 510. In some cases, the device may detect radiant light in terms of irradiance in units of watts/$m^2$ or other similar units. In other cases, the device may detect light in the visible range of wavelengths in units of foot candles or similar units. In many cases, there is a linear relationship between these values of irradiance and visible light.

Irradiance values from sunlight can be predicted based on the time of day and time of year as the angle at which sunlight strikes the earth changes. Exterior sensor 510 can detect radiant light in real-time, which accounts for reflected and obstructed light due to buildings, changes in weather (e.g., clouds), etc. For example, on cloudy days, sunlight would be blocked by the clouds and the radiant light detected by an exterior sensor 510 would be lower than on cloudless days.

In some embodiments, there may be one or more exterior sensors 510 associated with a single tintable window 505. Output from the one or more exterior sensors 510 could be compared to one another to determine, for example, if one of exterior sensors 510 is shaded by an object, such as by a bird that landed on exterior sensor 510. In some cases, it may be desirable to use relatively few sensors in a building because some sensors can be unreliable and/or expensive. In certain implementations, a single sensor or a few sensors may be employed to determine the current level of radiant light from the sun impinging on the building or perhaps one side of the building. A cloud may pass in front of the sun or a construction vehicle may park in front of the setting sun. These will result in deviations from the amount of radiant light from the sun calculated to normally impinge on the building.

Exterior sensor 510 may be a type of photosensor. For example, exterior sensor 510 may be a charge coupled device (CCD), photodiode, photoresistor, or photovoltaic cell. One of ordinary skill in the art would appreciate that future developments in photosensor and other sensor technology would also work, as they measure light intensity and provide an electrical output representative of the light level.

In some embodiments, output from exterior sensor 510 may be input to a BMS or window system. The input may be in the form of a voltage signal. The BMS or window system may process the input and pass an output signal with tinting instructions to the window controller 450 directly or through a master window controller 1102 (shown in FIG. 1C). The tint level of the tintable window 505 may be determined based on configuration information, override values, etc. Window controller 450 then instructs the PWM 415, to apply a voltage and/or current to tintable window 505 to transition to the desired tint level.

In disclosed embodiments, window controller 450 can instruct the PWM 415, to apply a voltage and/or current to tintable window 505 to transition it to any one of four or more different tint levels. In disclosed embodiments, tintable window 505 can be transitioned to at least eight different tint levels described as: 0 (lightest), 5, 10, 15, 20, 25, 30, and 35 (darkest). The tint levels may linearly correspond to visual transmittance values and solar gain heat coefficient (SGHC) values of light transmitted through the tintable window 505. For example, using the above eight tint levels, the lightest tint level of 0 may correspond to an SGHC value of 0.80, the tint level of 5 may correspond to an SGHC value of 0.70, the tint level of 10 may correspond to an SGHC value of 0.60, the tint level of 15 may correspond to an SGHC value of 0.50, the tint level of 20 may correspond to an SGHC value of 0.40, the tint level of 25 may correspond to an SGHC value of 0.30, the tint level of 30 may correspond to an SGHC value of 0.20, and the tint level of 35 (darkest) may correspond to an SGHC value of 0.10.

The BMS or window system in communication with the window controller 450 or a master window controller in communication with the window controller 450 may employ any control logic to determine a desired tint level based on signals from the exterior sensor 510 and/or other input. The window controller 415 can instruct the PWM 460 to apply a voltage and/or current to electrochromic window 505 to transition it to the desired tint level.

The references to a BMS in the above description can be replaced in some or all instances with references to a smart thermostat service or other home appliance service such as NEST.

Control Logic for Controlling Windows in a Building

Figure 6:
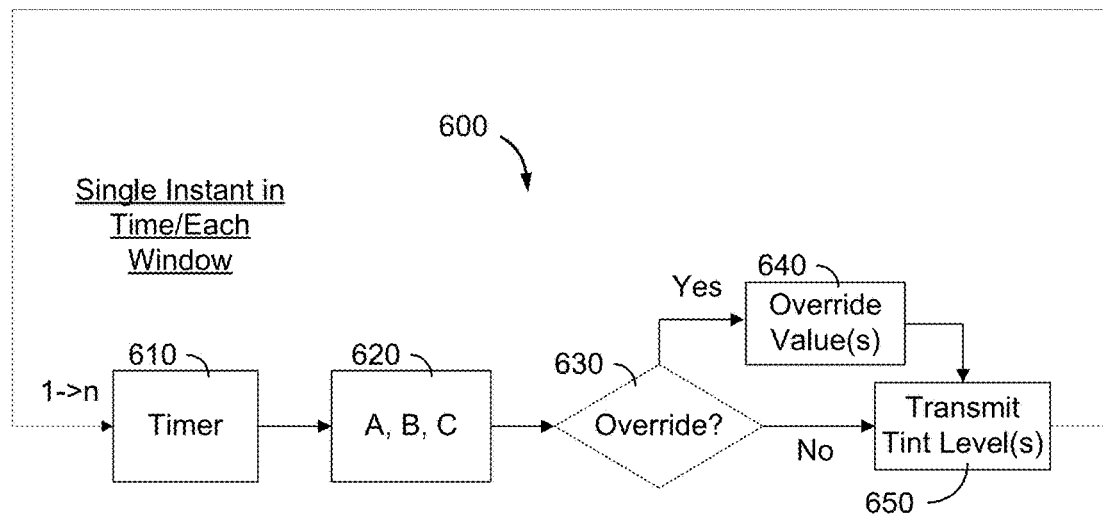
FIG. 6 is a flowchart showing some steps of predictive control logic for a method of controlling one or more electrochromic windows in a building.

FIG. 6 is a flowchart showing exemplary control logic for a method of controlling one or more tintable windows at a site, according to embodiments. The control logic uses one or more of the Modules A, B, and C to calculate tint levels for the tintable window(s) and sends instructions to transition the tintable window(s). The calculations in the control logic are run 1 to n times at intervals timed by the timer at step 610. For example, the tint level can be recalculated 1 to n times by one or more of the Modules A, B, and C and calculated for instances in time $t_i = t_1, t_2 \ldots t_n$. n is the number of recalculations performed and n can be at least 1. The logic calculations can be done at constant time intervals in some cases. In one cases, the logic calculations may be done every 2 to 5 minutes. However, tint transition for large pieces of electrochromic glass can take up to 30 minutes or more. For these large windows, calculations may be done on a less frequent basis such as every 30 minutes. Although Modules A, B, and C are used in the illustrated embodiment, one or more other logic modules can be used in other embodiments.

At step 620, logic Modules A, B, and C perform calculations to determine a tint level for each electrochromic window 505 at a single instant in time $t_i$. These calculations can be performed by the window controller 450 or by a window system. In certain embodiments, the control logic predictively calculates how the window should transition in advance of the actual transition. In these cases, the calculations in Modules A, B, and C can be based on a future time around or after transition is complete. In these cases, the future time used in the calculations may be a time in the future that is sufficient to allow the transition to be completed after receiving the tint instructions. In these cases, the controller can send tint instructions in the present time in advance of the actual transition. By the completion of the transition, the window will have transitioned to a tint level that is desired for that time.

At step 630, the control logic allows for certain types of overrides that disengage the algorithm at Modules A, B, and C and define override tint levels at step 640 based on some other consideration. One type of override is a manual override. This is an override implemented by an end user who is occupying a room and determines that a particular tint level (override value) is desirable. There may be situations where the user's manual override is itself overridden. An example of an override is a high demand (or peak load) override, which is associated with a requirement of a utility that energy consumption in the building be reduced. For example, on particularly hot days in large metropolitan areas, it may be necessary to reduce energy consumption throughout the municipality in order to not overly tax the municipality's energy generation and delivery systems. In such cases, the building may override the tint level from the control logic to ensure that all windows have a particularly high level of tinting. Another example of an override may be if there is no occupant in the room, for example, over a weekend in a commercial office building. In these cases, the building may disengage one or more Modules that relate to occupant comfort. In another example, an override may be that all the windows may have a high level of tinting in cold weather or all the windows may have a low level of tinting in warm weather.

At step 650, instructions with the tint levels are transmitted over a site network to window controller(s) in communication with electrochromic device(s) in one or more tintable windows 505 in the building. In certain embodiments, the transmission of tint levels to all window controllers of a building may be implemented with efficiency in mind. For example, if the recalculation of tint level suggests that no change in tint from the current tint level is required, then there is no transmission of instructions with an updated tint level. As another example, the building may be divided into zones based on window size. The control logic may calculate a single tint level for each zone. The control logic may recalculate tint levels for zones with smaller windows more frequently than for zones with larger windows.

In some embodiments, the logic in FIG. 6 for implementing the control methods for multiple tintable windows 505 in an entire site can be on a single device, for example, a single master window controller. This device can perform the calculations for each and every window in the site and also provide an interface for transmitting tint levels to one or more electrochromic devices in individual tintable windows 505.

Also, there may be certain adaptive components of the control logic of embodiments. For example, the control logic may determine how an end user (e.g. occupant) tries to override the algorithm at particular times of day and makes use of this information in a more predictive manner to determine desired tint levels. In one case, the end user may be using a wall switch to override the tint level provided by the predictive logic at a certain time each day to an override value. The control logic may receive information about these instances and change the control logic to change the tint level to the override value at that time of day.

Mechanical Shades

While certain disclosure emphasizes systems, methods, and logic for controlling optically switchable devices (e.g., electrochromic devices), these techniques can also be used to control mechanical shades or a combination of optically switchable devices and mechanical shades. Such a mechanical shade may, for example, include an array of microelectromechanical systems (MEMS) devices or other electromechanical systems (EMS) devices. Windows having a combination of electrochromic devices and EMS systems devices can be found in PCT international application PCT/US2013/07208, titled "MULTI-PANE WINDOWS INCLUDING ELECTROCHROMIC DEVICES AND ELECTROMECHANICAL SYSTEMS DEVICES," filed on Nov. 26, 2012, which is hereby incorporated by reference in its entirety. Mechanical shades typically have different power requirements than certain optically switchable devices such as electrochromic devices. For example, while certain electrochromic devices require a few volts to operate, mechanical shades may in some instances require larger voltages in order to establish sufficient potential to physically move the mechanical feature.

Microblinds and microshutters are examples of types of EMS devices. Some examples of microblinds and microshutters, and their methods of fabrication are described respectively in U.S. Pat. Nos. 7,684,105 and 5,579,149, both of which are hereby incorporated by reference in their entirety.

In certain embodiments, a mechanical shade may be an array of EMS devices, where each EMS device including a portion (e.g., a hinge or an anchor) attached to the substrate and a mobile portion. When actuated by electrostatic forces, the mobile portion may move and obscure the substrate. In the unactuated state, the mobile portion may expose the substrate. In the example of some microblinds, the mobile portion may be an overhanging portion of a material layer that curls when actuated by electrostatic forces. In the example of some microshutters, the mobile portion can rotate or curl when actuated. In some cases, the EMS devices may be actuated and controlled by electrostatic control means. In the example of microshutters, the electrostatic control means may control the angle of rotation or curl to different states. The substrate with the array of EMS devices may also include a conductive layer. In the example of microblinds, the microblinds are fabricated using a thin layer(s) under controlled stress. In embodiments with an array of EMS devices, each EMS device has two states, an actuated state and an unactuated state. The actuated state may render the array of EMS devices substantially opaque and the unactuated state may render the array of EMS devices substantially transparent, or vice versa. The actuated and unactuated states may also switch between substantially reflective (or absorptive) and substantially transparent, for example. Other states are also possible when the array of EMS devices is in an actuated or unactuated state. For example, microshutters, a type of MEMS device, may be fabricated from a tinted (but non-opaque) coating, which when shut provide a tinted pane, and when open the tint is substantially removed. Further, some arrays of EMS devices may have three, four, or more states that are able to be transitioned to. In some cases, the EMS devices can modify visible and/or infrared transmission. The EMS devices may reflect in some cases, may be absorptive in other cases, and in yet other embodiments may provide both reflective and absorptive properties. In certain embodiments, the EMS devices may be operated at variable speeds, e.g., to transition from a high transmission state to a low-transmission state, or a no-transmission state. In certain cases, the EMS devices may be used in conjunction with an electrochromic device (or other optically switchable device) as a temporary light blocking measure, e.g., to block light until the associated electrochromic device has transitioned to a lower transmissivity state or a higher transmissivity state.

What is claimed is:

1. A window control system, wherein the window control system is configured to:
   communicate via an application programming interface (API), with a security system of a building; and
   control the optical state of one or more optically switchable windows in the building responsive to data provided by the security system, including one or both of (i) darkening the optical state of the one or more windows and (ii) transitioning the one or more windows to a clear state.

2. The window control system of claim 1, further comprising at least one other system selected from the group consisting of a lighting system, an HVAC systems, and a home appliance control system, wherein the window control system and the at least one other system are configured to communicate via the API.

3. The window control system of claim 1, further comprising a lighting system, wherein the window control system, the lighting system, and the security system are configured to communicate via the API, and wherein the lighting system is configured to control emergency warning lights and/or emergency egress lighting responsive to data provided form the security control system.

4. The window control system of claim 1, wherein the window control system is configured to adjust the optical state of the one or more windows to a dark tint state or a clear tint state in response to the data provided by the security system.

5. The window control system of claim 4, wherein the data provided by the security system includes scheduling information used for controlling the optical state of the one or more optically switchable windows.

6. The window control system of claim 1, wherein darkening the optical state of the one or more windows is performed in response to the data indicating a lockdown event.

7. The window control system of claim 1, wherein transitioning the one or more windows to a clear state is performed in response to the data indicating a burglary.

8. The plurality window control system of claim 1, wherein the security system is configured to receive information from an occupancy sensor in the building.

9. The window control system of claim 1, wherein the security system comprises a security camera.

10. The window control system of claim 1, wherein the security system is configured to control one or more door locks.

11. The window control system of claim 1, wherein the security system is configured to trigger a burglar alarm or a fire alarm.

12. A method of controlling the optical state of one or more optically switchable windows in a building, the building including a window control system and a security system, the method comprising:

transmitting information from the security system to the window control system via an application programming interface (API); and adjusting the optical state of at least one of the one or more optically switchable windows responsive to the information, including one or both of (i) adjusting the optical state of at least one optically switchable window to a dark tint state, and (ii) transitioning the one or more windows to a clear state.

13. The method of claim 12, further comprising transmitting additional information from the security system to a lighting system via the API; and controlling emergency warning lights and/or emergency egress lighting responsive to the additional information.

14. The method of claim 12, wherein adjusting the optical state of the at least one optically switchable window to the dark tint state is performed when the information indicates a lockdown event.

15. The method of claim 12, wherein transitioning the one or more windows to a clear tint state is performed when the information indicates a burglary.

16. The method of claim 12, wherein the information comprises scheduling information, and wherein the optical states of the one or more windows are adjusted based on the scheduling information.

17. The method of claim 12, further comprising controlling one or more door locks via the security system.

18. The method of claim 12, further comprising triggering a burglar alarm or a fire alarm.

* * * * *